United States Patent [19]

Kitadate

[11] Patent Number: 5,721,924
[45] Date of Patent: Feb. 24, 1998

[54] METHOD AND DEVICE FOR OBTAINING A VALUE OF A REFERRED TO VARIABLE DEFINED IN A SOURCE PROGRAM HAVING A SPECIFIC VARIABLE NAME

[75] Inventor: Yohtaro Kitadate, Kawasaki, Japan

[73] Assignee: Fujitsu Limited, Kawasaki, Japan

[21] Appl. No.: 758,299

[22] Filed: Dec. 3, 1996

Related U.S. Application Data

[63] Continuation of Ser. No. 149,777, Nov. 10, 1993, abandoned.

[30] Foreign Application Priority Data

Nov. 10, 1992 [JP] Japan .................. 4-299891

[51] Int. Cl.$^6$ .................................................. G06F 9/00
[52] U.S. Cl. ........................................ 395/703; 395/704
[58] Field of Search .......................... 395/703, 704, 395/708

[56] References Cited

U.S. PATENT DOCUMENTS

| | | | |
|---|---|---|---|
| 4,517,640 | 5/1985 | Hattori et al. | 364/200 |
| 4,667,290 | 5/1987 | Goss et al. | 364/300 |
| 4,953,084 | 8/1990 | Meloy et al. | 364/200 |
| 5,038,348 | 8/1991 | Yoda et al. | 371/19 |
| 5,093,779 | 3/1992 | Sakurai | 395/600 |
| 5,210,859 | 5/1993 | Aoshima et al. | 395/575 |
| 5,212,794 | 5/1993 | Pettis et al. | 395/700 |
| 5,261,103 | 11/1993 | Takeuchi et al. | 395/700 |
| 5,339,431 | 8/1994 | Rupp et al. | 395/700 |

OTHER PUBLICATIONS

Norton et al, The IBM PC & PS/2, 1985, pp. 114–115.

*Primary Examiner*—Lucien U. Toplu
*Attorney, Agent, or Firm*—Armstrong, Westerman, Hattori, McLeland & Naughton

[57] ABSTRACT

In a debugger, interpreter, etc., a referred-to variable determining method is used to obtain a variable in a program having a specific variable name and referred to from a specific position according to the specific position and the specific name in a source program. According to section information obtained by splitting the source program at a block start position and a block end position, block tree structure information representing a relationship in a set of blocks, and variable-name-to-block correspondence information indicating blocks in which a variable having a same variable name is defined, a referred-to variable is determined by comparing a path in the block tree structure information with the set of blocks associated with the specific variable name.

19 Claims, 23 Drawing Sheets

SECTION INFORMATION

BLOCK TREE STRUCTURE INFORMATION

TYPES OF SYMBOL ELEMENTS

| TYPE | CONTENTS |
|---|---|
| START OF FILE | • FILE NAME • SCOPE OF SYMBOL ELEMENTS IN FILE |
| START OF FUNCTION | • FUNCTION NAME • START LINE NUMBER |
| START OF BLOCK | • START LINE NUMBER |
| VARIABLE ELEMENT | • VARIABLE NAME • ADDRESS<br>• TYPE • SIZE<br>• INDICATOR OF WHETHER EXTERNAL VARIABLE OR INTERNAL VARIABLE |
| END OF BLOCK | • END LINE NUMBER |
| END OF FUNCTION | • END LINE NUMBER |

FIG. 4

| BLOCK IDENTIFIER | SYMBOL ELEMENT NUMBER | VARIABLE NAME |
|---|---|---|
|  |  |  |
|  |  |  |
|  |  |  |

FIG. 11

| SECTION START LINE NUMBER | POINTER TO BLOCK NODE |
|---|---|
|  |  |
|  |  |
|  |  |

FIG. 14

| B1 | n0 |
|---|---|
| B4 | n1 |
| B5 | n2 |

FIG. 22

| TYPE OF SYMBOL ELEMENT | CONTENTS OF PROCESSING |
|---|---|
| • FILE START ELEMENT | • OBTAINING SECTION INFORMATION AREA FOR NEW FILE |
| • FUNCTION START ELEMENT | • ENTERING LINE NUMBER IN ELEMENT AND ADDRESS OF GENERATED NODE |
| • FUNCTION END ELEMENT | • ENTERING LINE NUMBER IN ELEMENT AND ADDRESS OF MOVED-TO NODE |
| • BLOCK START ELEMENT | • ENTERING LINE NUMBER IN ELEMENT AND ADDRESS OF GENERATED NODE |
| • BLOCK END ELEMENT | • ENTERING LINE NUMBER IN ELEMENT AND ADDRESS OF MOVED-TO NODE |

FIG. 15

| SECTION START LINE NUMBER | POINTER TO BLOCK NODE |
|---|---|
| L0 | (B6) |
| L1 | (B5) |
| L2 | (B3) |
| L3 | (B1) |
| L4 | (B3) |
| L5 | (B2) |
| L6 | (B3) |
| L7 | (B5) |
| L8 | (B4) |
| L9 | (B5) |
| L10 | (B6) |
| L11 | 0 |

METHOD AND DEVICE FOR OBTAINING A VALUE OF A REFERRED TO VARIABLE DEFINED IN A SOURCE PROGRAM HAVING A SPECIFIC VARIABLE NAME

This application is a file wrapper continuation of application Ser. No. 08/149,777 filed Nov. 10, 1993, now abandoned.

BACKGROUND OF THE INVENTION

1. Field of the Invention

The present invention relates to a method of processing a computer program, and more specifically, to a referred-to variable determining method used by a debugger for retrieving a value of a specified variable in a source program from a program data area and displaying it on a display screen, or by an interpreter for reading a variable, performing an arithmetic operation and writing a value to the variable according to the description of the source program, etc.

2. Description of the Prior Art

Many computer source programs consist of a data definition part and a procedure part. A data part defines variables to be processed in a program as being associated with the name, type, and other attributes of the variable. A procedure part refers to the variable by its name, that is, reads a value from the variable or stores a value into the variable, so as to describe a procedure containing an arithmetic operation, etc.

A compiler is a translation program, and converts the source program to an object program which also consists of a data part and a procedure part. In this case, the data part is a collection of areas of variables defined in the data definition part in the source program, and the procedure part consists of a sequence of CPU instructions, accessing area of the variables.

In a source program written in a language having a block structure such as C language, etc., a procedure part includes of a number of blocks, each includes a variable definition part and a procedure part. Furthermore, the procedure part may contain several sub-blocks. Some blocks contain no variable definitions. A variable defined in a block can be referred to from the block and from sub-blocks inside the block, but cannot be referred to from outside of the block. Such a variable is called local variable of the block.

If a variable sharing the same name with variable i defined in block X is defined in sub-block Y inside block X, then the variable i defined in block X cannot be referred to from sub-block Y or a further smaller block contained in sub-block Y. Using variable name i, sub-block Y can refer only to the variable i defined in the block Y.

Therefore, a variable referred to by its variable name from a block is the first variable detected when its variable name is searched for from the referring block toward outside in the entire block structure.

A source program may consist of several source programs, namely source files. The entire group of source files are referred to as one source program. The entire group of source programs form a block, and a source file is a sub-block contained in the block. In C language, each function defined in a source file may be regarded as a block, and a block defined in the function can be regarded as a sub-block of it.

Thus, all blocks in a source program form a tree structure as to the inclusion relation.

The fields of applications in industries are described below in detail.

When a newly written program is being executed, the program often abnormally terminates. At this time, the programmer retrieves the value of each variable at the time of the abnormal termination, and determines whether or not it is an expected value, or whether not the value of the variables or satisfy the expected relation, etc., thus help determining the cause of the abnormal termination. To attain this, the programmer uses for example a debugger for the value of variables being read from a memory or a memory dump and being displayed on the screen of a display unit.

A debugger obtains, according to the name of a variable specified by a user, the address of the variable at which the variable is stored, and reads and displays the contents of the variable. However, in a language having a block structure, since a referred-to variable can depend on the referring-to position, the address of the variable must also be determined based on the referring-to position in addition to only the name of the variable. This process is preferably performed at the highest speed possible.

In a debugger, a referred-to variable can be determined as a variable of the same name defined in the innermost block containing the referring to position specified by the user, namely by searching for a variable having the specified name in the innermost block, and then searching for it in the immediately outer block if it has not been detected in the prior block, and so forth. Otherwise, a variable having the specified name is searched sequentially from the outermost block to the innermost block. When the same variable name is detected, it is temporarily stored. If the process has been performed onto the last specified block, then the last stored variable is determined to be the referred-to variable.

In this case, however, the name of a variable must be compared with a specific name for the total number of variables defined in all blocks involved, thereby requiring a long time in completing the process.

On the other hand, to determine the relationship between variables during the execution of a program, a procedure or an equation specified by a user can be performed and evaluated preferably by an interpreter because the interpreter decodes and executes the procedure and the equation in the same format of a source program, and requires no translation process as a pre-processing. During the execution, the interpreter needs to obtain from variable name the variable addresses in a memory or a memory dump. In this case, the interpreter needs to determine referred-to variables according to referring-to positions and variable names.

Some interpreters analyze a source program according to the syntax of the current language, convert it to a program in an intermediate language while replacing the name of each variable in the source program with the identifier of a referred-to variable as a pre-processing, and interpret and execute the program written in the intermediate language. In this method, since a referred-to variable can be immediately determined, a process of determining a referred-to variable according to a variable name is not required during the execution, thereby greatly improving the performance at the execution time.

However, in a process of converting to an intermediate language, a process of determining a referred-to variable from each line in a source program is required. In this case, the process of determining is performed by the same method as used by the debugger.

As described above, according to the conventional method, a variable is searched for with its name from the block containing a specific position toward outer blocks, or sequentially from the outermost block to the innermost block so as to select an effective variable, thereby taking a long time.

SUMMARY OF THE INVENTION

The present invention aims at providing a referred-to variable determining method of determining at a high speed a variable in the program to be referred to according to a referring-to position and a variable name specified.

In the referred-to variable determining method according to the present invention, the following processes are performed in determining a referred-to variable, that is, a variable which has a specified name and can be referred to from a specified position, according to the specified position and variable name in a source program written in a language having a block structure.

First, section information is generated, having a section identifiers associated to sections obtained by splitting the whole lines in a source program by block starting positions and ending positions. Furthermore, block tree structure information representing the inclusion relationships of all blocks in the source program is generated.

Then, variable-name-to-block correspondence information consisting of a pair variable name and their corresponding blocks which defines the variable name is generated.

The section information contains a section identifier and a pointer to a node of a block. The pointer points to the node of the innermost block in blocks including the section specified by the section identifier in the block tree structure information.

When a specific position and a specific variable name are given to determine a referred-to variable, a pointer is picked up from the element of the section information containing the referring-to position specified. Then, a referred-to variable is determined as that defined in the node nearest to leaf of the tree which is commonly contained in the path from pointed node to the root of the tree of block tree structure information and is contained in a set of blocks associated with the specified variable name in the variable-name-to-block correspondence information.

At this time, the node of the block tree structure information contains at least pointer to parent node and block identifier corresponding to the block.

The variable-name-to-block correspondence information contains a set of variable names and defines block identifiers of blocks which the variable of the variable name. When a specified referring-to position and a specified variable name are obtained, an element of a section including the position selected in the section information and pointer to node is picked up. Then, a set of block identifiers of blocks on the path from the node pointed by the picked up pointer to the root of the tree of block tree structure information forms a first block list. A set of block identifiers associated with the specified variable name in the variable-name-to-block correspondence information are obtained according to the specified variable name and forms a second block list. Then, a variable in the block common to the first block list and the second block list is determined to be a referred-to variable having the variable name defined in the innermost block.

Instead of the above described block identifiers, a pointer to a block in the block tree structure information can also be used in the variable-name-block correspondence information.

In this case, the node of the block tree structure information contains only the pointer to its parent block which includes each block directly. The variable-name-to-block correspondence information includes a pair of variable name and pointers pointing to blocks defining the variable of the names.

When a specific position and a specific variable name are given, a pointer in the section information corresponding to a section containing the specified position and pointers to parent blocks contained in the nodes on the path from the node pointed to the root form a first block list.

A set of pointers contained by the variable-name-to-block correspondence information corresponding to the specified variable name form a second block list.

A referred-to variable is determined as that defined in the node nearest to leaf of the tree which is commonly contained in the first and the second block list.

If a referred-to variable is determined in a source program comprising a plurality of source files, then each source file is regarded and processed as forming a block.

When a referred-to variable determining process is repeatedly performed, the first block list or the second block list with respect to a variable once referred to is stored in a memory to be used again. If a next given specified position corresponds to the first block list or if a given specified variable name corresponds to the stored second block list, then the corresponding list can be used.

According to the present invention, a referred-to variable can be determined according to a position and a variable name in a source program having a block structure by comparing, using section information indicating section obtained by splitting a program into sections as being associated with blocks, block tree structure information, and variable-name-to-block correspondence information, the path in the block tree structure information with a set of blocks in the variable-name-to-block correspondence information. Therefore, a process of comparing variable names with the specified one of all the variables defined in each block in the path is not required, thereby performing a variable determining process at a high speed.

A block tree structure information can be easily managed by containing block identifiers in the block tree structure information.

On the other hand, a pointer to a block in the block tree structure information can be used instead of the block identifier to identify the block. Since it is not necessary to use a block identifier in the block tree structure information in this case, the amount of necessary memory capacity can be effectively reduced.

When a referred-to variable is determined in a source program comprising several source files, the square program can be processed in the same manner as a source program comprising a single source file by regarding each source file as forming a single block.

When a referred-to variable determining process is repeatedly performed, the process can be performed at a high speed by reserving and re-using the first or the second list of variables once referred to.

Furthermore, an information processing device comprising an information generating unit for generating the above described section information, block tree structure information, and the variable-name-to-block correspondence information and a determining unit for determining a referred-to variable according to the above described information easily and effectively uses the referred-to variable determining method according to the present invention.

Especially if a processor executing a translation program used in the information processing device functions as the above described information generating unit and a processor executing a debugger or a interpreter functions as the above described determining unit, then a referred-to variable can be effectively determined and the process performance of the debugger or the interpreter can be greatly improved.

BRIEF DESCRIPTION OF THE DRAWINGS

FIG. 4 shows the kinds of symbol elements used in the embodiment of the present invention;

FIG. 11 shows the format of the variable table according to the present invention;

FIG. 14 shows the format of the source section information according to the present invention;

FIG. 15 shows the contents of the process of generating the source section information according to the present invention;

FIG. 22 shows an example of the second block list according to the embodiment of the present invention;

DESCRIPTION OF THE PREFERRED EMBODIMENTS

An embodiment of the present invention is explained below by referring to the attached drawings.

First explained is a tree structure used in the present invention. Take a point that is called a root node or simply a root. The root has one or more nodes called child nodes. The root can be referred to as a parent node of the child nodes. Furthermore, the nodes can be added one or several child nodes and so on. We get a tree by terminating the adding process. A node other than the root has only one parent node, and the root has no parent node. All nodes of a tree have a path from a root to itself. A node which has no child is referred to as a leaf.

The block structure of a program can be represented as a tree. That is, the innermost blocks correspond to leaves, their immediately outer blocks correspond to their parents, and the outermost block corresponds to a root of the tree.

Figure 1:
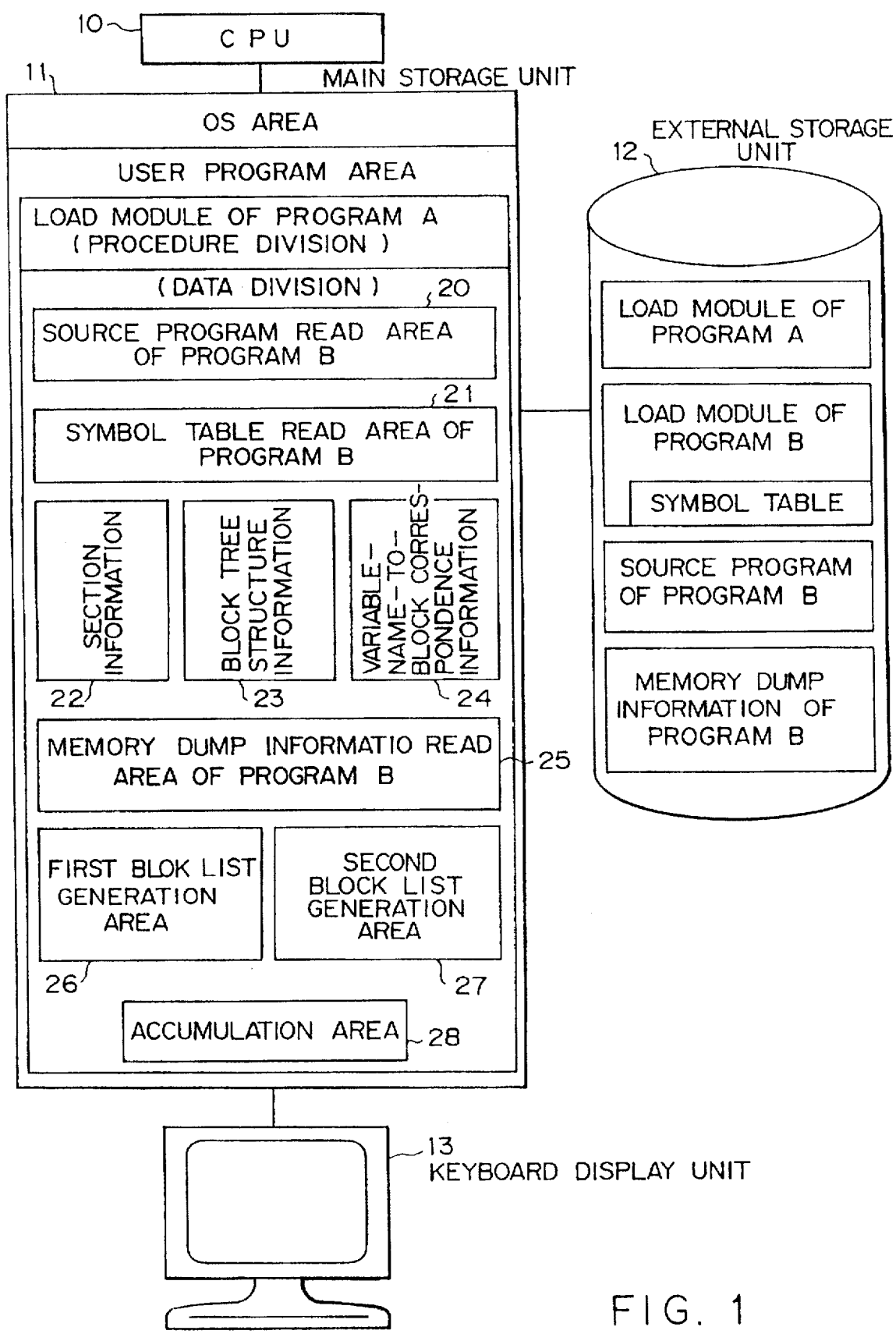
FIG. 1 shows the general configuration of an embodiment of the present invention.

FIG. 1 shows the general configuration of an embodiment of the present invention. A main storage unit 11 can be segmented to an OS area and a user program area. The OS area stores an operating system (OS). A central processing unit 10 sequentially reads instructions from a user program in the user program area and executes a process, while accessing the main storage unit 11.

An external storage unit 12 stores OS, a user program and other data. The OS reads the user program from the external storage unit 12 into the main storage unit 11 to execute it, reads the data stored in the external storage unit 12 into the main storage unit 11 according to the designation of the user program, and provides the function of outputting processed data or data being processed from the main storage unit 11 to the external storage unit 12.

A keyboard display unit 13 is used by a user for specifying a program to be executed and for providing data for the program, or used by OS or a user program for displaying to the user a prompt to input or an execution result, etc.

According to the present invention, the user program area stores program A performing a referred-to variable determining process. Program B is a program to be debugged, written by the user and translated by the translation program, or compiler. Program A determines a corresponding referred-to variable in program B after the user has entered a specific line number and a variable name through the keyboard display unit 13, determines a variable area assigned by a translation program in the memory dump information of program B stored in the external storage unit 12 according to the variable information on the referred-to variable, reads the value of the referred-to variable from the variable area, and displays it on the keyboard display unit 13.

The external storage unit 12 stores program A for processing the present embodiment, a load module of program B to be processed by program A, a symbol table contained therein, the source program of program B, and the memory dump information of program B.

Memory dump information is outputted to the external storage unit 12 when the user instructs to output it during the execution of the program B, or when program B has been abnormally terminated, and contains a recent value of each variable in program B at that time.

The load module of program B in the external storage unit 12 contains a symbol table. It is generated by a translation program when it translates the source program of program B, or by a linker program when it links the object modules into one module. The table stores a start position of each source file, start and end position of a block, and a variable name, type of a variable and a relative address in a program, etc. as to the variable defined in the block.

The data division of program A in the main storage unit 11 contains section information 22, block tree structure information 23, and variable-name-to-block information 24. They are already generated by program A using the symbol table in the load module of program B in the external storage unit 12 as a source. The block tree structure information 23 is a tree structure information representing the relationship between blocks in the program B in a form of a tree. In addition to the information, a source program read area 20 of program B, a symbol table read area 21, and a memory dump information read area 25 are allocated in the user program area of the main storage unit 11.

The source program read area 20 of program B is used for reading the source program of program B into the memory storage from the external storage unit 12 or displayed on the keyboard display unit 13. A user specifies the referring to position and the name of a variable in order to refer to the variable on the displayed source program.

The symbol table read area 21 of program B is used when a symbol table is read into the memory storage from the external storage unit 12 to generate the section information 22, the block tree structure information 23, and the variable-name-to-block correspondence information 24.

The memory dump information read area 25 of program B is used when a value of a determined referred-to variable is read into the memory storage from the external storage unit 12.

In a first block list generation area 26, a first block list is generated according to a specified position, the section information 22, and the block tree structure information 23. In a second block list generation area 27, a second block list is generated according to a specified variable name and the variable-name-to-block correspondence information 24. Once generated, the first block list and the second block list are stored in an accumulation area 28 for future re-use.

Figure 2:
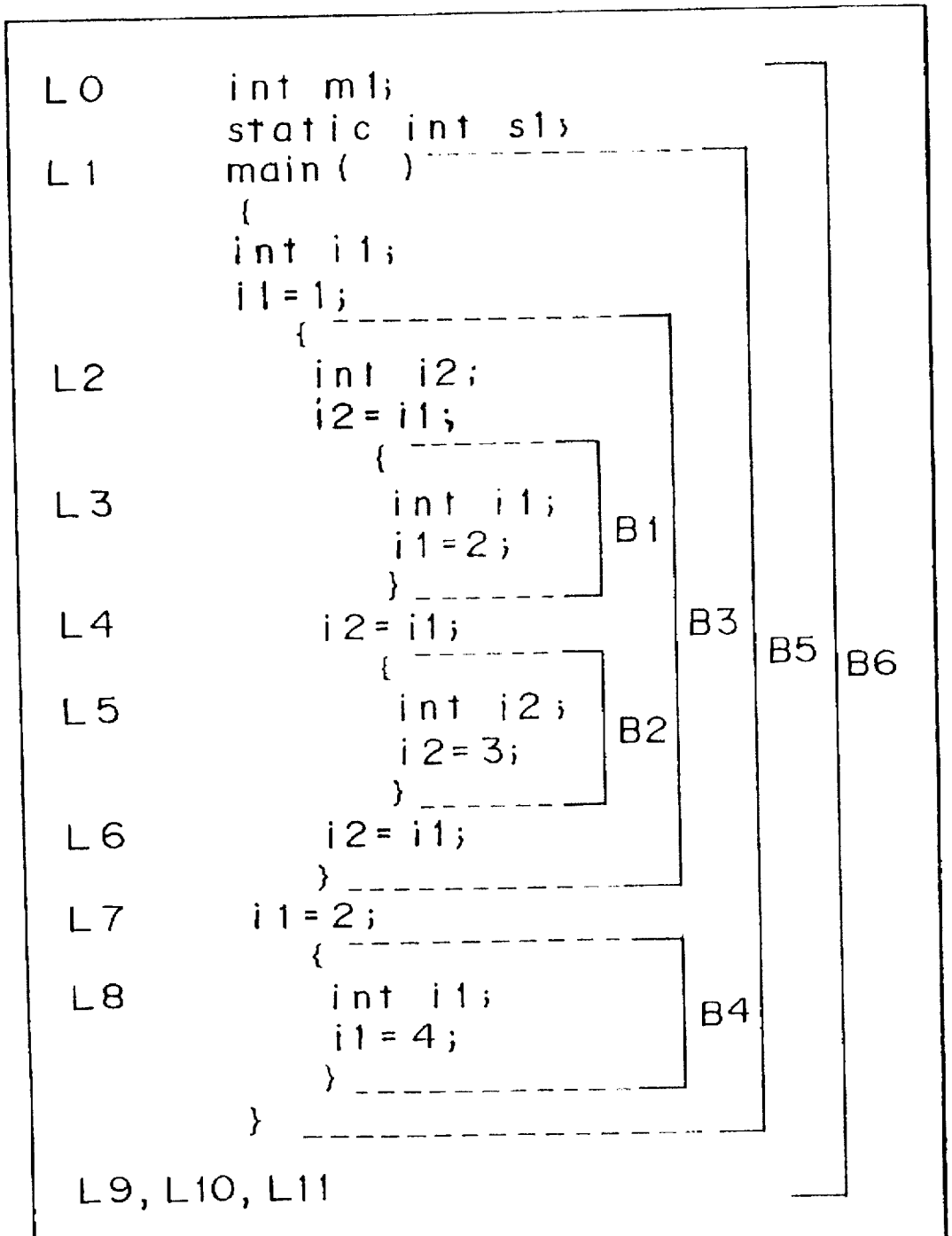
FIG. 2 shows an example of the source program of program B to be processed according to the embodiment of the present invention.

FIG. 2 shows an example of the source program of program B written in C language.

In the source program B shown in FIG. 2, a function, or a portion in a function being enclosed by a pair of "{" and "}" forms a block. A block in a function can be multiply enclosed. That is, a block can be included in another block.

Program B has variables defined whose names are m1, s1, i1, and i2. However, the variable names i1 and s1 can be shared by a plurality of variables.

The source program of program B consists of a single source file. That is, a load module of program B is obtained by translating a single source file. The source file corresponds to block B6.

main is a function name and indicates the start of the description of the procedure division of function main. Function main corresponds to a single block B5 which contains blocks B3 and B4, and block B3 contains blocks B1 and B2.

Variable i1 is defined in block B5, its second inner block B1, and B4 which is the first inner block of B5. Therefore, the second i1 is effective in block B1, the third i1 is effective in block B4, and the first i1 is effective in block B5 excluding blocks B1 and B4. Variable i2 is defined in block B3 and its internal block B2. Therefore, i2 of block B2 is effective in block B2, while i2 of block B3 is effective in block B3 excluding block B2.

The start or end positions of a block are indicated by line numbers L0, L1, L2, ..., etc. A split portion of a source program delimited by one of these line numbers is referred to as a section.

When a user specifies a position in a program, he or she only has to specify it with a line number in the source file if the source program comprises a single source file. If the source program comprises a plurality of source files, the user specifies as a position, for example, both a name of a source file and a line number or an identifier for identifying a source file and a line number in the file. Otherwise, a serial number assigned throughout the source files can be used. In these cases, each source file corresponds to a single block.

Figure 3A:
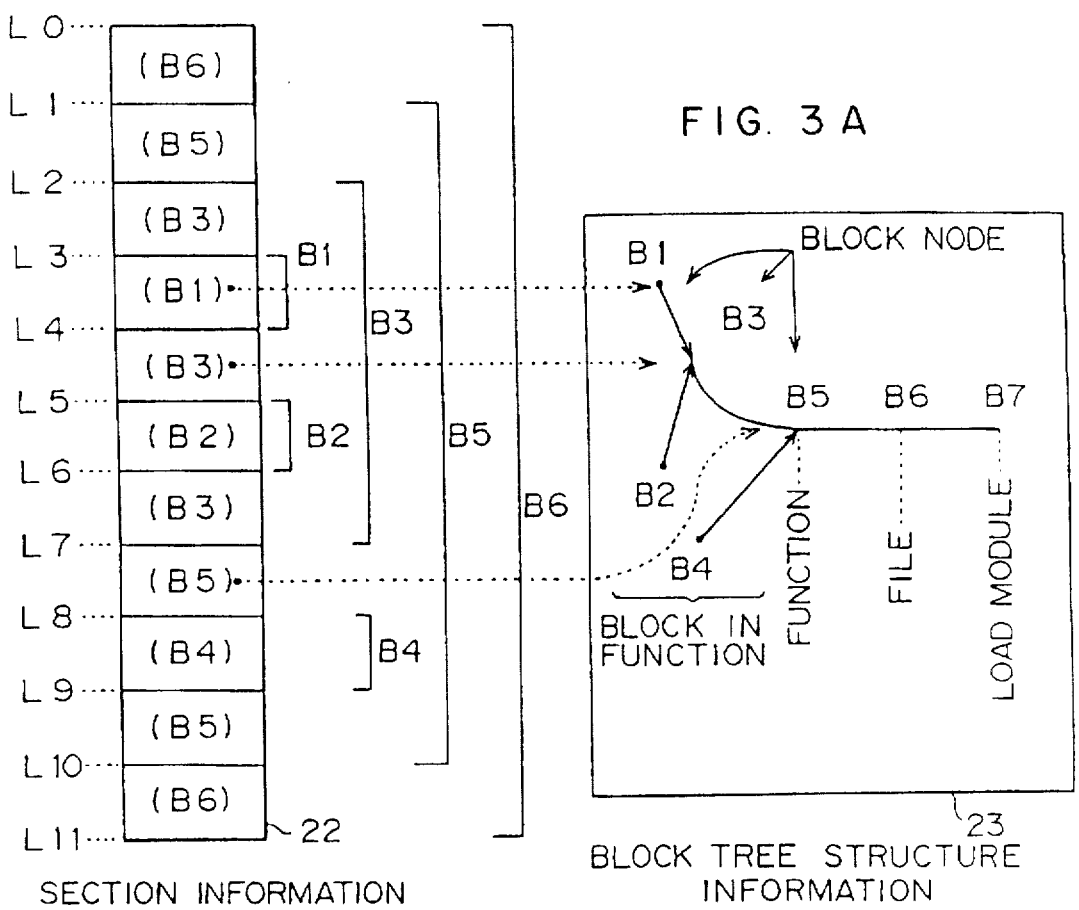
FIG. 3 shows the outline of the section information, block tree structure information, variable-name-to-block correspondence information according to the embodiment of the present invention.
Figure 3B:
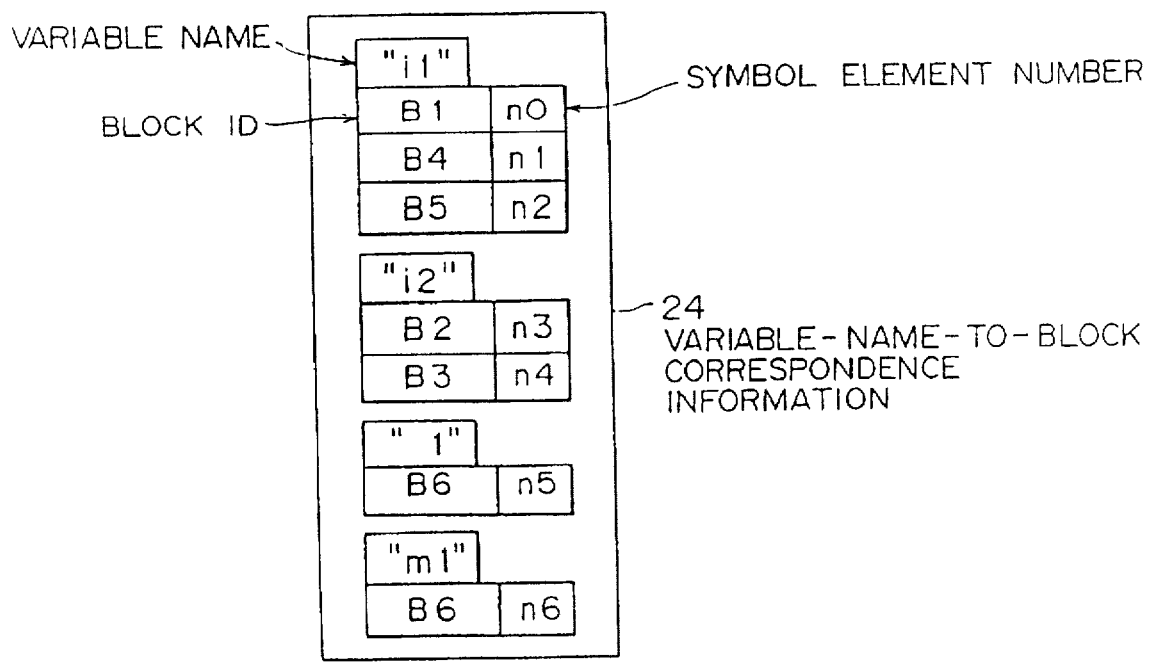

FIG. 3 shows the concept of the section information 22, the block tree structure information 23, and the variable-name-to-block correspondence 24.

The section information 22 stores a pointer to a node in the block tree structure information 23. For example, the section between lines L0 and L1 holds a pointer to a node of block B6 in the block tree structure information 23. Line numbers L9, L10, and L11 indicate the same line in the source file shown in FIG. 2, but are distinguished and treated as different lines in the section information 22 for convenience sake. The block tree structure information 23 indicates the relationship between the blocks in program B. Block B7 is a load module, Block B6 is a source file, block B5 is the function main in block B6 and contains blocks B3 and B4, block B3 contains blocks B1 and B2. Each node in the tree is hereinafter referred to as a block node.

The variable-name-to-block correspondence information 24 indicates a variable name and all blocks in which a variable of the same name is defined. For example, variable name i1 is defined in blocks B1, B4, and B5, and their symbol element number are n0, n1, and n2 respectively. In the present embodiment, we suppose the symbol element number of a variable is the target information determined from the specified line number and a variable name. For this purpose, the variable-name-to-block correspondence information 24 contains symbol element numbers.

A symbol element is a component of symbol table in a load module, and contains the type of variable, relative-address-in-a-program, and so on. Therefore, a variable area in the memory dump information of program B can also be obtained according to a symbol element. A process of obtaining an address of a variable area according to a relative-address-in-a-program in a symbol element is normally to add an address value depending on the start address of the data part of a program in loading area, and is not explained in detail here.

FIG. 4 shows the type and contents of symbol elements used in the present embodiment among the elements composing the symbol table. Since other symbol elements are not required in a referred-to variable determining process, they are neglected after reading to the symbol table read area 21 of program B.

A "file start" element indicates the start of symbol elements of a source file, and stores a file name of the source file and a span of symbol elements in the file. A span information of "file start" elements indicates the start element number of the next source file. For the last source file, the next symbol element number after the last symbol element of the source file is used. A plurality of file start elements exist in a symbol table in the case that a load module is obtained by combining translation results of a plurality of source files.

A "function start" element indicates the start of symbol elements of a function, and stores a name and a start line number of the function in the source file.

A "block start" element indicates the start of symbol elements of a block in a function, and stores a start line number of the block in the source file.

A "variable element" corresponds to each variable defined in a source program, and stores a variable name, a relative address in a program, type, size, and an indicator of a global variable or a local variable, namely can or cannot be referred to by another source file.

A "block end" element indicates the end of symbol elements in a block in a function, and stores an end line number of the block in a source file.

A "function end" element indicates the end of symbol elements of a function, and stores an end line number of the function.

Figure 5:
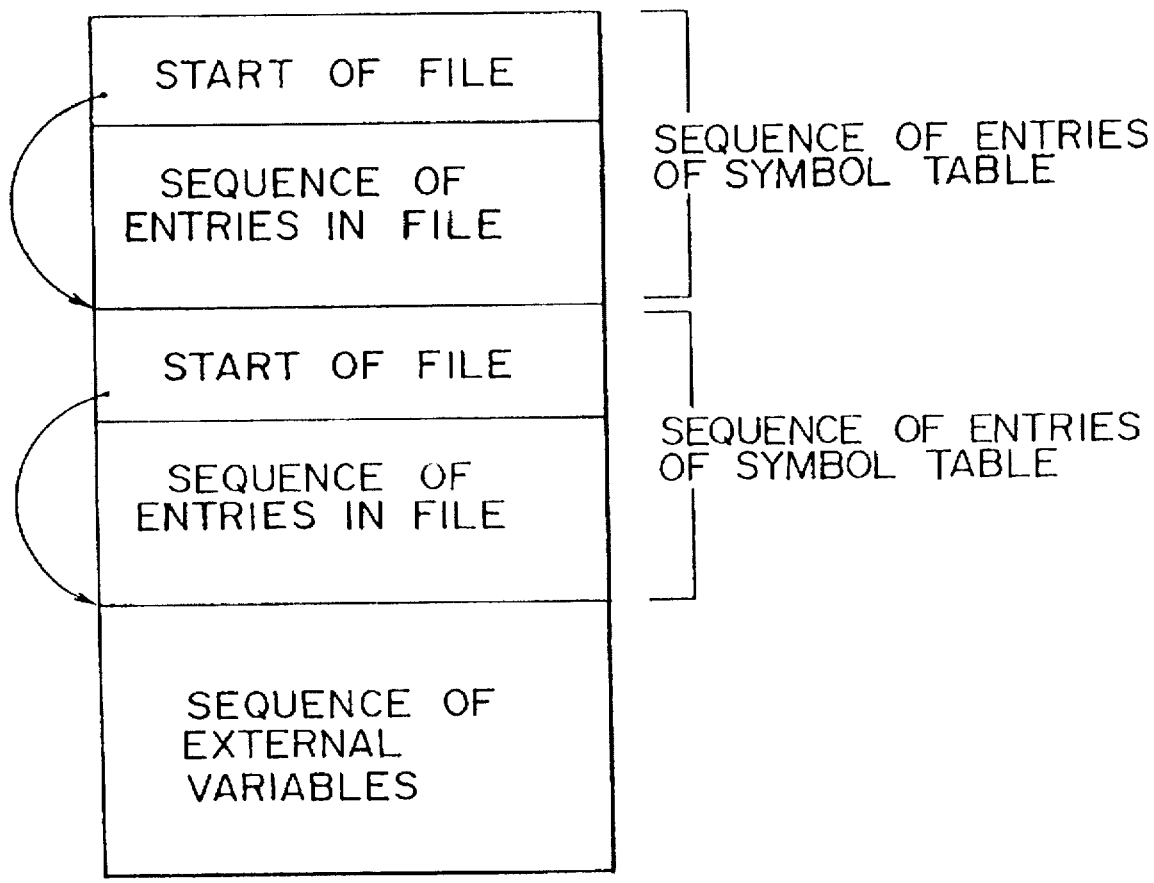
FIG. 5 shows the general structure of the symbol table used in the embodiment of the present invention.
Figure 6:
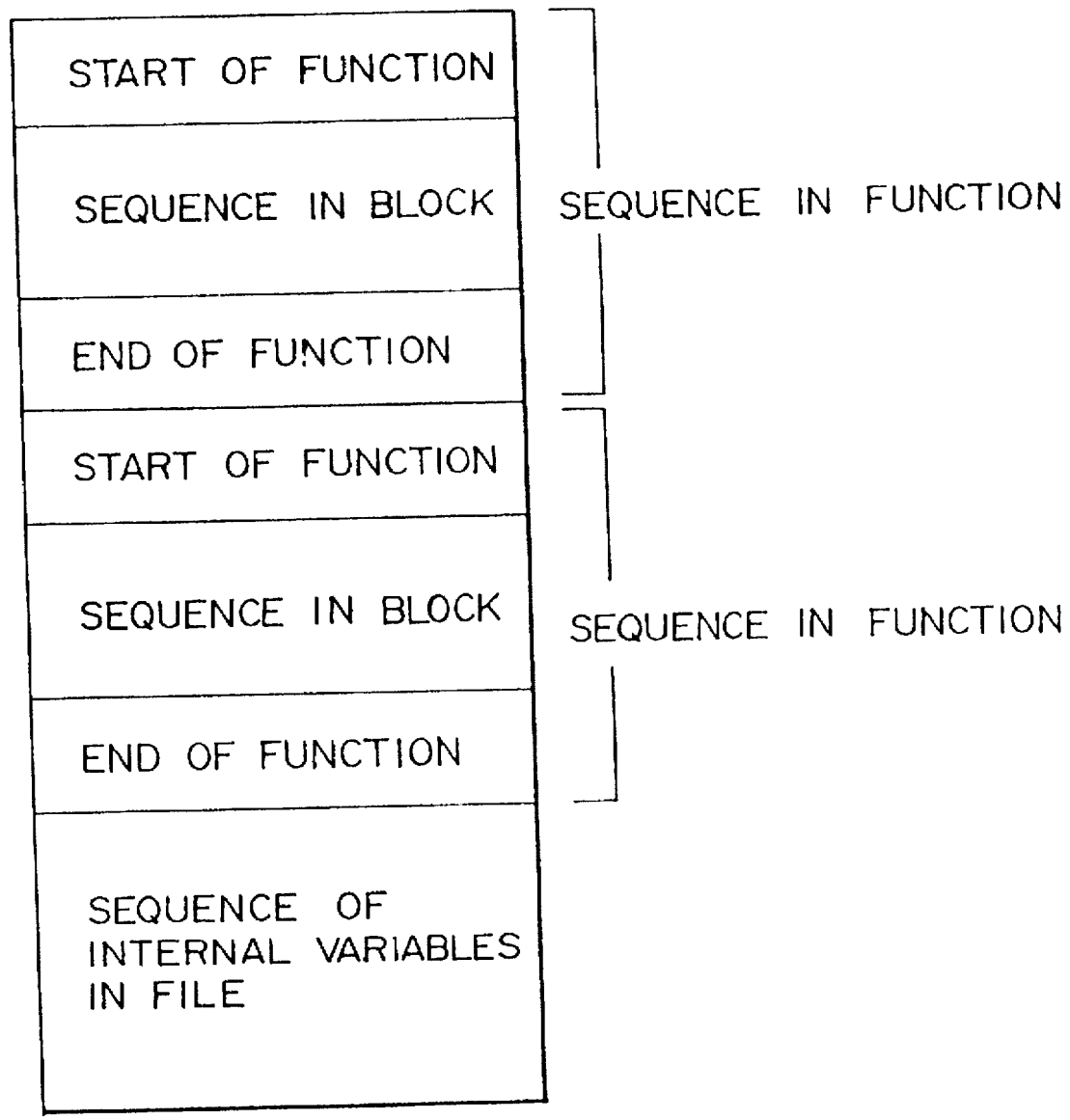
FIG. 6 shows the sequence of entries in a file in the symbol table shown in FIG. 5.
Figure 7:
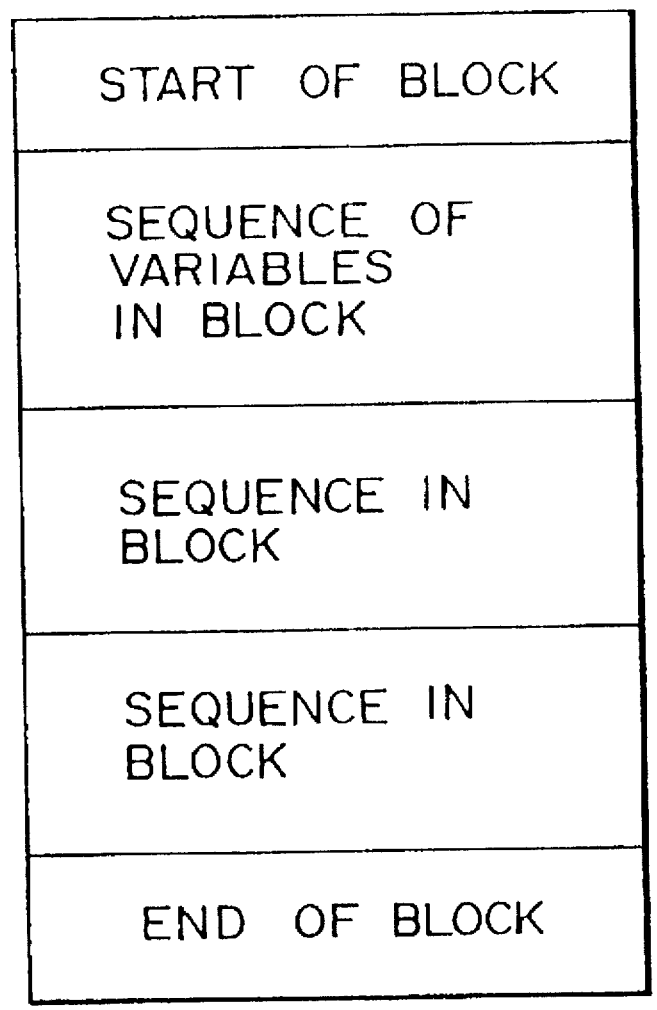
FIG. 7 shows the sequence of blocks in the symbol table shown in FIG. 6.

FIGS. 5 through 7 indicate the sequence of symbol elements read to the symbol table read area 21 of program B, and show only the sequence of necessary elements for the explanation of the present embodiment.

FIG. 5 shows the configuration of an entire symbol table. A table comprises a plurality of file sequences followed by a sequence of external variables which are variable defined positively "external" or not and defined out of functions in a source file. There many be external variables local to a source file, which is defined "static". They are hereinafter called internal variables in a file. File sequence starts with a "file start" element followed by a sequence of entries in a file. The sequence of entries in file consists of various elements such as a function in a source file, a block, a internal variable defined in the source file, etc.

However, among variables defined in a source file, a variable referred to by another source file, that is, a global variable, exists in a sequence of external variables shown in FIG. 5. If no such global variables exist, no sequence of external variables exists, either.

FIG. 6 shows a sequence of entries in file. The sequence consists of a plurality of sequences in function followed by a sequence of internal variables in file. A sequence in function starts with a "function start" element followed by a sequence in block. The sequence in block corresponds to the outermost block forming the function, and consists of a sequence of symbol elements of blocks and variables defined therein. The sequence in function ends with a "function end" element.

A plurality of sequences in function are followed by a sequence of internal variables in file. The internal variables in file can be referred to commonly within the source file. However, they cannot be referred to from outside the source file. If no such variables exist, no sequence of internal variables in file exist, either.

FIG. 7 shows the sequence in block shown in FIG. 6. The sequence starts with a "block start" element, and ends with a "block end" element. The "block start" element is followed by a sequence of variable elements corresponding to the variables defined in the block.

If blocks are defined within a certain block in a source program, then several sequences of blocks is followed by sequences of variables. These sequences in block, like the sequence in block shown in FIG. 7, also consists of a sequence of variables in block and several sequence in blocks. However, if a block has no variables defined in it, and has no variable defined in its internal blocks, then the sequence of blocks may not be generated by the translator, and even if generated, it is not required in a referred-to variable determining process and its corresponding sequence in block can be omitted.

Figure 8:
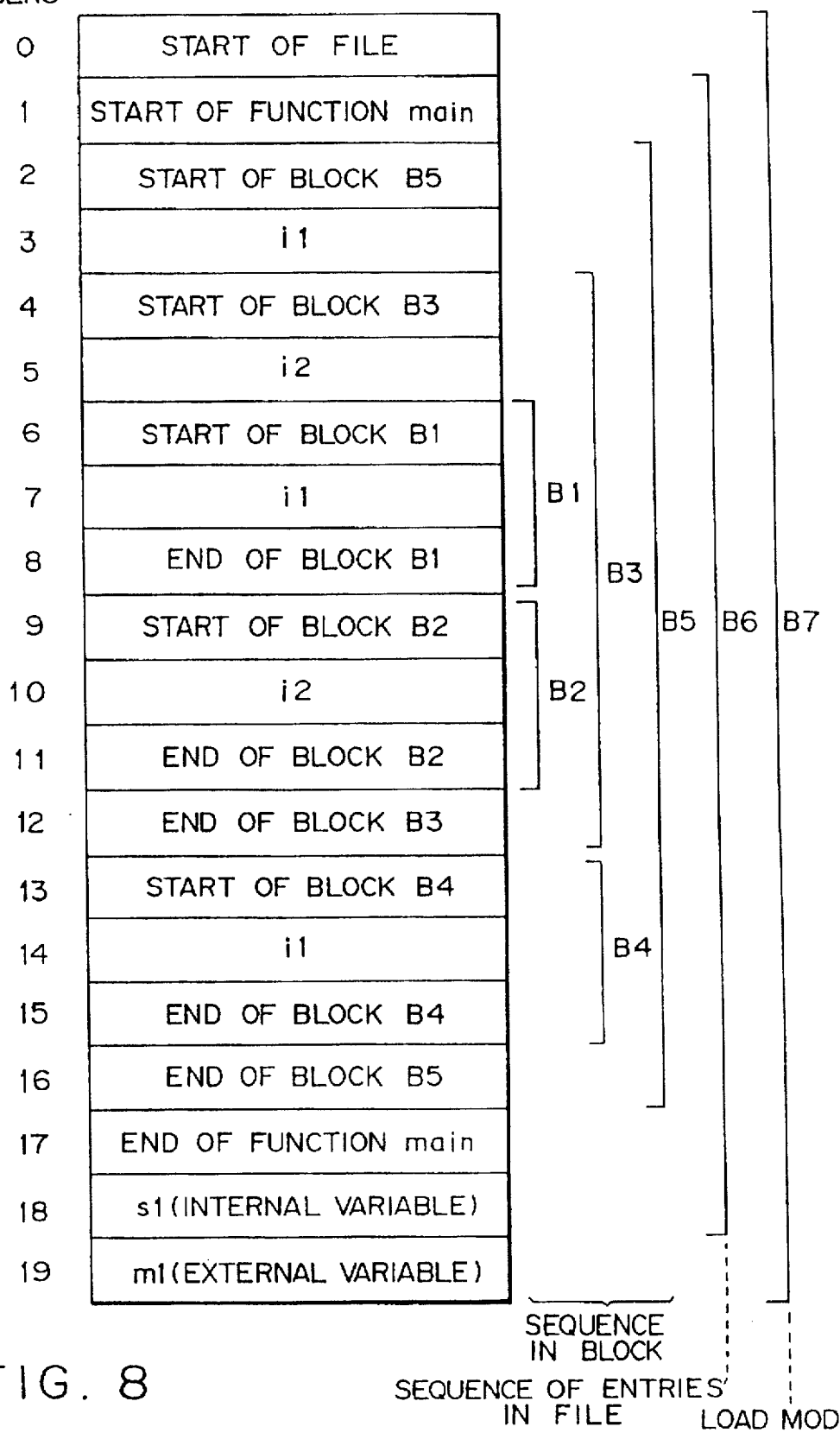
FIG. 8 shows the symbol table of program B shown in FIG. 2.

FIG. 8 practically shows the symbol table of program B used in the present embodiment. The table shown in FIG. 8 is obtained by deleting symbol elements not used in the present embodiment from the symbol table stored in the external storage unit 12.

A load module of program B is a translation result of a single source file. Therefore, the entire symbol table indicates a single sequence of entries of symbol table corresponding to the source file, and corresponds to blocks B7 and B6 shown in FIG. 3.

The symbol table starts with a "file start" element, and ends with a variable element associated with variable m1. The variable element has a description indicating that it is an external variable. As shown in FIG. 2, since variable m1 is defined outside functions and is not static, it is an external variable.

The "file start" element is followed by a sequence of entries in file. In this example, the sequence of entries consists of the sequence in function main and a variable element of variable s1. Since variable s1 can be referred to only within the function main, it is described that the variable is an internal variable.

The sequence in function starts with the start element of file function main and ends with the end element of function main. Function main comprises a single block B5 which contains the sequences in block corresponding to blocks B3 and B4. Block B3 contains the sequences in block corresponding to blocks B1 and B2.

The start element of block B5 is followed by the variable element of variable i1 defined in block B5.

The start element of block B3 is followed by the variable element of variable i2 defined in block B3.

In the same way, there exist variable elements corresponding to variables i1 and i2 defined in other blocks.

If a block start element is followed by another block start element before a block end element, then succeeding block is included in the preceding block. If a block start element is followed by another block start element after a block end element, then the succeeding block starts after the preceding block ends and both blocks are included in their immediately outer block. Thus, the order of start elements and end elements of a block determines the inclusion relationship in a set of blocks, and the block tree structure information 23 can be generated based on the relationship.

A block in which specified variable is defined can be obtained based on the position of a variable element of the variable in the symbol table. If a variable element, follows a start element of a block, the variable is defined in the block. If available element follows an end element of a function, then the variable is an internal variable or an external variable. If it is indicated in the variable element to be an internal variable, the variable is a variable in a file. If it appears after file sequences, it is a global variable defined in any source file in a load module. Thus, it can be determined in which node the present variable is included. Thus, the variable-name-to-block correspondence information 24 shown in FIG. 3 can be generated.

A block start element and a block end element store a line number in a source file. Based on the line numbers, the source file is divided into a plurality of sections, the relation of section and block directly containing it is sufficient to generate the section information 22 shown in FIG. 3.

Next, processes of generating the section information 22, the block tree structure information 23, and the variable-name-to-block correspondence information 24 are explained by referring to FIGS. 9 through 15. It is performed by program A using a symbol table read to the symbol table read area 21 of program B.

Figure 9:
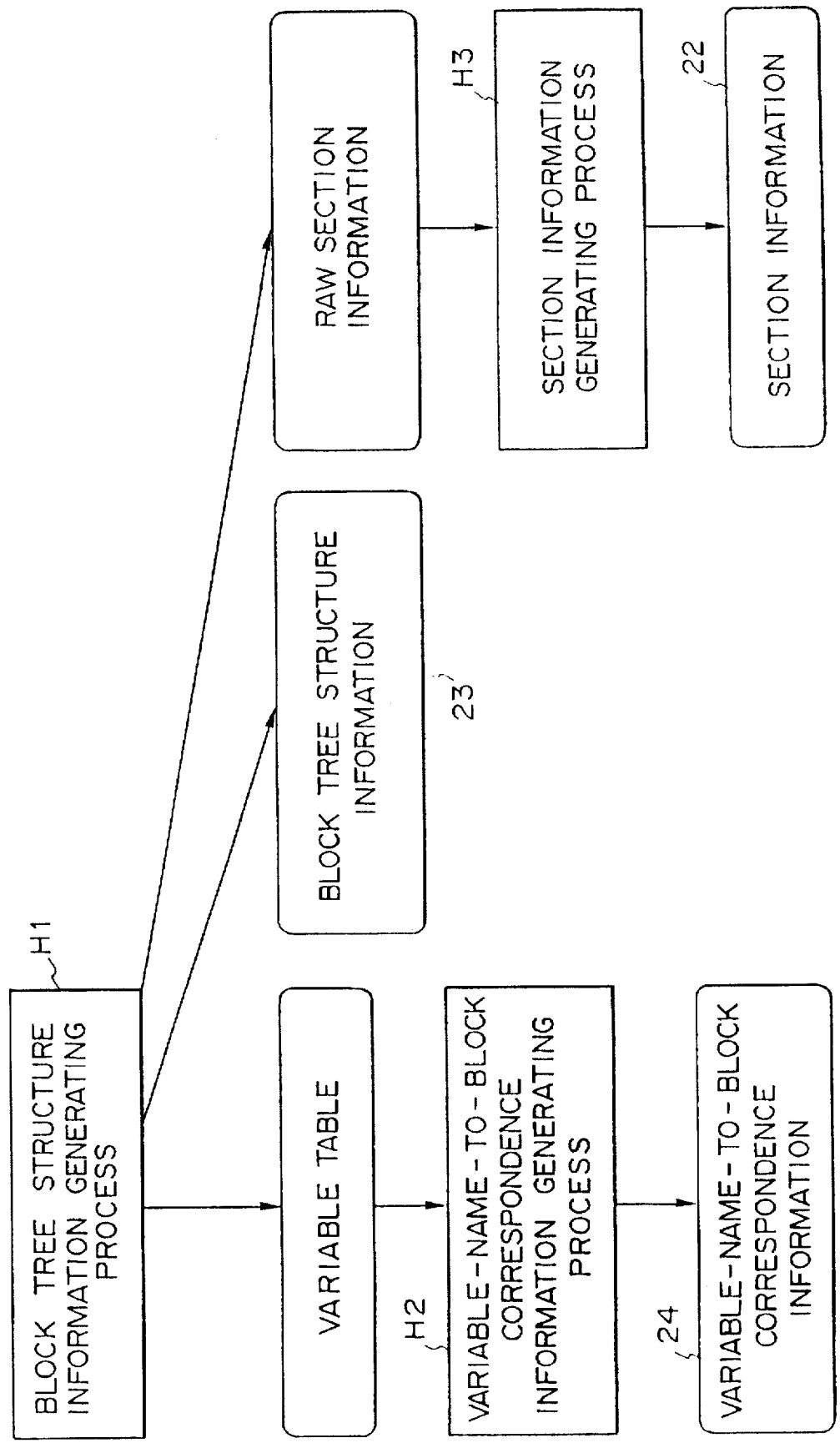
FIG. 9 is the flowchart indicating the process of generating the block tree structure information, variable-name-to-block correspondence information, and section information according to the present invention.

FIG. 9 is the general flowchart of the processes. In process H1 shown in FIG. 9, the block tree structure information is generated according to the symbol table, and then the block tree structure information 23, the variable-table, and source section information are generated. A variable table comprises a block identifier for identifying a block having a variable element, a symbol element number of the variable element, and a variable name extracted from the variable element, for all variable elements in the symbol table. The raw section information is generated for all source files, and comprises a start line number of a section delimited by a start line number and an end line number of a function or block in a symbol table, and a pointer to the corresponding block node in the block tree structure information 23.

Then, the variable-name-to-block correspondence information 24 is generated on the basis of the variable table in process H2, and the section information 22 is generated on the basis of the source section information in process H3.

Figure 10:
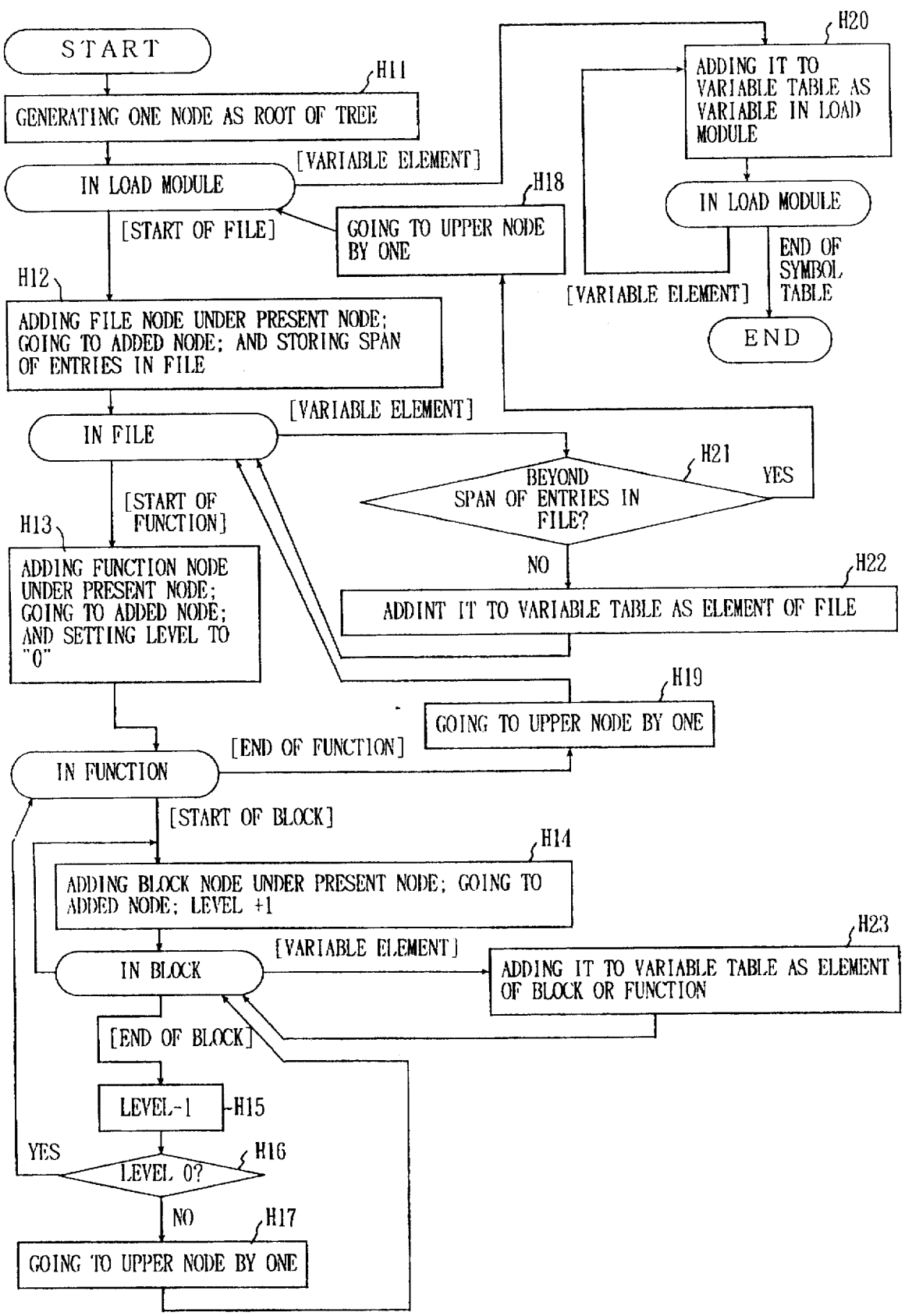
FIG. 10 is the detailed flowchart indicating the process of generating the block tree structure information according to the present invention.

FIG. 10 is the flowchart showing in detail the process H1 shown in FIG. 9. A process of generating the block tree structure information 23 on the basis of the symbol table shown in FIG. 8 is explained by referring to FIG. 10.

In the process of generating the block tree structure information, a node is generated corresponding to the root of a tree in process H11 and is set as current node, namely, the value of internal pointer to current node in process 14 is set as the address of the node. The node corresponds to the block of a load module.

Next, a symbol element having symbol element number 0 is retrieved from the symbol table of program B shown in FIG. 8. Since it is a start element of a file, a block node with identifier B7 corresponding to the file is added in process H12 after the root of the tree. Then, a span of symbol elements in a file pertaining to the start element of the file is stored. In the present case, symbol element number 19 after the sequence of entries in file shown in FIG. 8 is stored as the span of symbol elements in a file.

Since the next symbol element having symbol element number 1 is a start element of function main, a block node 86 corresponding to function main is added to the tree as a child of the root node in process H13, and then the block node level is set to 0.

The next symbol element is a start element of block B5. Process 14 adds a node B5 as a child node of current node B5 and it is set as current node. Next, since a variable element of variable i1 appears, it is set as a variable in block B5 in process H23, and the symbol element number 3, variable name i1, and block identifier B5 which may be generated by the process H1 itself are stored in a variable table.

Since the next symbol element is a start element of block B3, a new block node is added as a child of current node B6 in process H14, B6 is set as current node, and the value of 1 is added to the current value 0 of the block node level. That is, level 1 refers to the level of block B3. Next, since a variable element of variable i2 appears, symbol element number 5, variable name i2, and block identifier B3 are stored in the variable table.

The process performed on symbol elements 4 and 5 is also performed on the symbol elements having symbol element numbers 6 and 7. At this time, the block node level is 2 corresponding to block B1.

Since the end element of block B1 appears, control is passed to process H15, and the block node level is decremented by 1 and current node is set as the present node of old current node, B1. Then, it is determined whether or not the level is 0 in process H16. As the level indicates 1, the path is directed in the direction of "no" in process H16. In process H17, current node is changed from the block node of block B1 to the its present node in the tree, that is, the block node of block B3.

However, since the next symbol element is a start element of block B2, control is returned to process H14, the block node of block B2 is added under the block node of block B3, and symbol element number 10 of variable i2, variable name i2, block identifier B2 are stored in the variable table, and current node is set as node B2. At this time, the block level indicates 2 again.

Next, since the end element of block B2 appears, control is passed to process H15, and the block node level is decremented by 1. Then, the level indicates 1 and control is passed to process H17, and current node is changed from block B2 to block B3.

Next, since the end element of block B3 appears, current node is changed to B5, and the block node level is furthermore decremented by 1. Then, the level indicates 0 and control is passed to process H16 and led to the path of "yes" Thus, the control is passed to the block node of function main.

Processes H14, H23, H15, and H16 are performed also on the start element of block B4, the variable element of variable i1, and the end element of block B4. Symbol element number 14, variable name i1, and block identifier B4 of variable i1 are stored in the variable table. In process H16, level 0 is determined and the control is passed to the block node of function main again.

Next, the end element of block B5 appears followed by the end element of function main. Then, control is passed to process H19 and current node is changed from the block node of function main to the block node of the file.

The next symbol element is the variable element of internal variable s1 of the file. Since its symbol element number 18 is smaller than the symbol element number 19 stored as the span of symbol elements in the file, the determination in process H21 instructs to trace the path of "no". In process H22, symbol element number 18, variable name s1, and block identifier B6 of variable s1 are stored in the variable table. Block identifier B6 designates block B6 corresponding to the file.

Finally, the variable element of external variable m1 is retrieved and control is passed to process H21. In this case, since symbol element number 19 equals or exceeds the scope of symbol elements in the file, control is passed to process H18 and current node returned to the block node of the root of the tree B7 corresponding to a load module.

Next, process H20 is entered, and symbol element number 19, variable name m1, and current block identifier B7 of variable m1 are stored in the variable table.

Since no variable elements in the load module exist except for m1, the process terminates.

Thus, all the block nodes generated and added in processes H11, H12, H13, and H14 shown in FIG. 10 form the block tree structure information FIG. 11 shows the format of the variable table. Each element in the variable table comprises a block identifier, a symbol element number, and a variable name.

Figure 12:
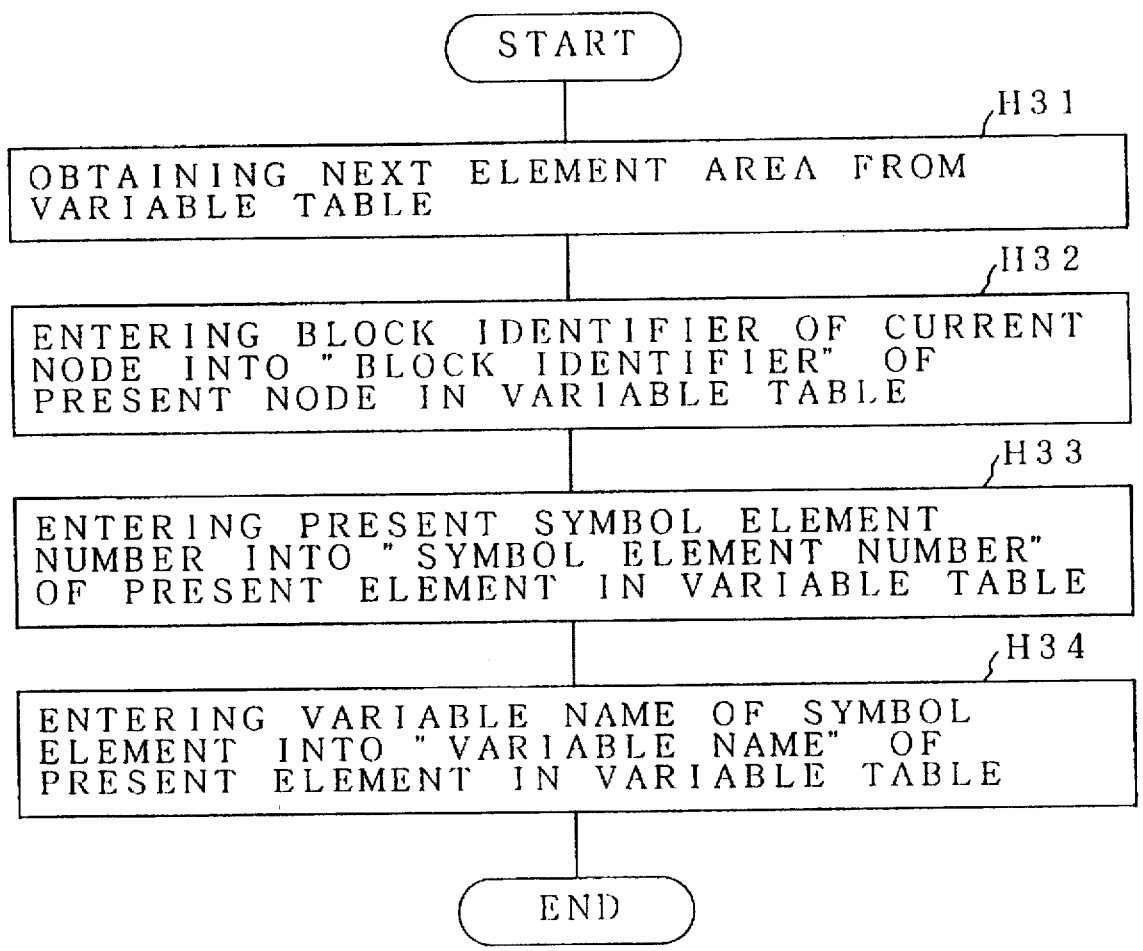
FIG. 12 is the flowchart indicating the process of generating the variable table according to the present invention.

FIG. 12 is the flowchart indicating in detail the process of adding elements of the variable table in processes H20, H21, and H23 shown in FIG. 10. In process H31 shown in FIG. 12, the storage area of the next element is retrieved from the variable table in the main storage unit 11. Next, in process H32, a block identifier corresponding to the current block node is written to the block identifier area in the retrieved storage area. In process H33, the symbol element number of the variable element is written to the symbol element number area. In process H34, the variable name of the variable element is written to the variable name area. Then the process terminates.

Figure 13:
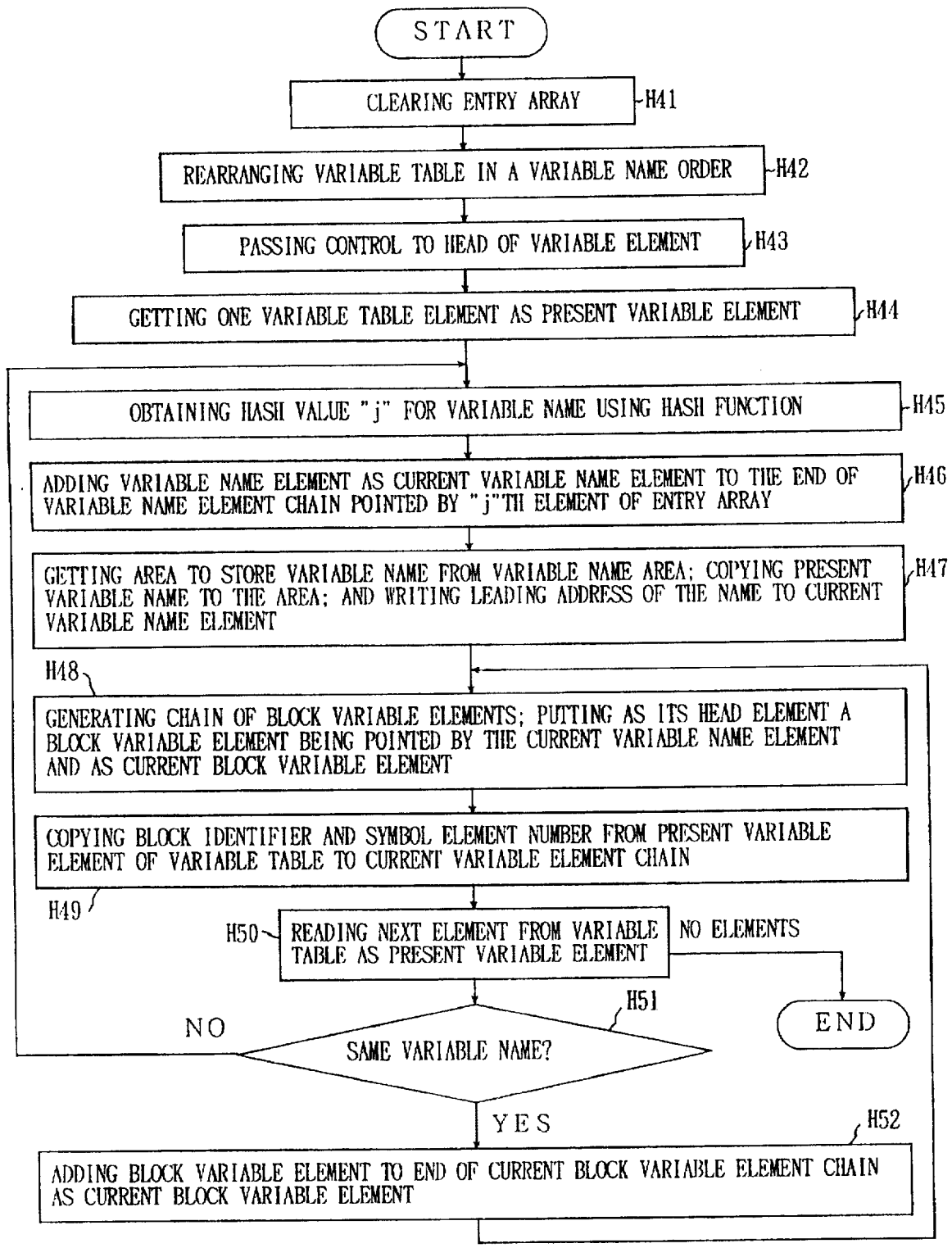
FIG. 13 is the flowchart indicating the process of generating the variable-name-to-block correspondence information according to the present invention.

FIG. 13 is the flowchart indicating in detail process H2 of generating the variable-name-to-block correspondence information 24 on the basis of the generated variable table as shown in FIG. 9. In the main storage, The variable-name-to-block correspondence information 24 is composed of entry array, a variable name area, and a queue pool. The entry array stores a pointer into the queue pool corresponding to the hash value obtained by transforming a specified variable name using a hash function.

In process H41 shown in FIG. 13, all the pointers in the entry array is cleared. Then, in process H42, elements in the variable table is rearranged for variable name. In process H43, the head of the rearranged variable table is assigned as present element. In process H44, the present element is retrieved from variable table.

In process H45, the variable name in the retrieved present element is transformed using a hash function into a hash value j. In process H46, if the j-th element of entry array was zero, a storage area is got from the queue pool for a variable name element and its address is stored in j-th element of entry array and if the j-th element was not zero, a storage area for variable name element is got from the queue pool and added to last of variable name element chain pointed to by the j-th element of entry array. When the same hash value is obtained from different variable names, the new variable name element is added to the chain already existing in the queue pool pointed to by the j-th element.

In process H47, the variable name of the present element in the variable table is written to the variable name area external to the queue pool, and the starting address of the area where the variable name is written is written as a pointer into the corresponding variable name element in the queue pool.

In process H48, a storage area is got for a block variable element, its address being stored in current variable name element in order to be pointed to. It becomes the head of block variable element chain. .P30

In process H49, the block identifier and the symbol element number of the present element in the variable table are written to the block variable element storage area.

In processes H47 and H49, all information on the present element has been retrieved from the variable table and stored in the variable-name-to-block correspondence information 24, and the next element is retrieved from the variable table in process H50.

In process H51, it is determined whether or not the present and previous elements have the same variable name. If yes, in process H52, another block variable element is added to the last of current chain of block variable element in the queue pool, and the newly added block variable element is processed as a current block variable element.

Processes H52, H49, and H50 are repeatedly performed until the last element having the same variable name is detected.

In process H51, when the variable name is different from that of the previous element, then control is returned to process H45, and the variable name is transformed using a hash function. Then, a new variable name element is added in process H46. If the value of j-th element of entry array was zero, which means j is the new has value, then a new pointer to an address in the queue pool is stored in the entry array, and the variable name element is added to the area having the address as a starting element of chain of name elements. Then, block variable elements are generated by continuing the processes of H48, H49, and H52.

Unless the next element exists in process H50, the process terminates. The processes in FIG. 13 can transform the information in the variable table to the more applicable variable-name-to-block correspondence information 24 for a referred-to variable determining process.

FIG. 14 shows the format of the raw section information generated together with the block tree structure information 23 in process H1 shown in FIG. 9. The raw section information is generated for each source file in a source program, and each element comprises a section start line number and a pointer to a block node in the block tree structure information 23.

FIG. 15 shows the contents of the process of generating the raw section information, and these processes are performed if a start or an end element of the block, etc., in the symbol table is accessed in a process in FIG. 10.

If an accessed symbol element is the start element of a file, then a storage area is set in the main storage unit 11 for the raw section information corresponding to the file.

If the element is the start element of a function, then the start line number described in the element is written as the section start line number, and the address of the block node generated in process H13 shown in FIG. 10 corresponding to the function is written as a pointer to the block node, into the storage area of the section information.

If the element is the end element of a function, its end line number is written as a section start line number, and the address of the moved-to block node in process H19 is written as a pointer. The current block node corresponds to a source file.

If the element is the start element of a block, then its start line number is written as a section start line number, and the address of a block node generated in process H14 shown in FIG. 10 corresponding to the block is written as a pointer.

If the element is the end element of a block, then its end line number is written as a section start number, and the address of the moved-to block node after process H16 is written as a pointer. If the level does not indicate 0 in process H16, then the moved-to block node is the one of the immediately outer block. If the level indicates 0 in process H16, then it refers to a block node of the function.

While the block tree structure information 23 is generated in FIG. 10, the process shown in FIG. 15 is simultaneously performed to obtain a section by delimiting a source file by the start line number and the end line number of a function or a block.

Process H3 shown in FIG. 9 generates the section information 22 by summarizing the source section information of each source file. Since the source program of program B comprises a single source file by assumption, the section information 22 for program B can be obtained by adding the source file start line number and the source file block node address to the head of the generated source section information. If a source program comprises a plurality of source files, then a process of, for example, describing a section start line number using a serial line number common to all source files is required.

Figures 16, 17:
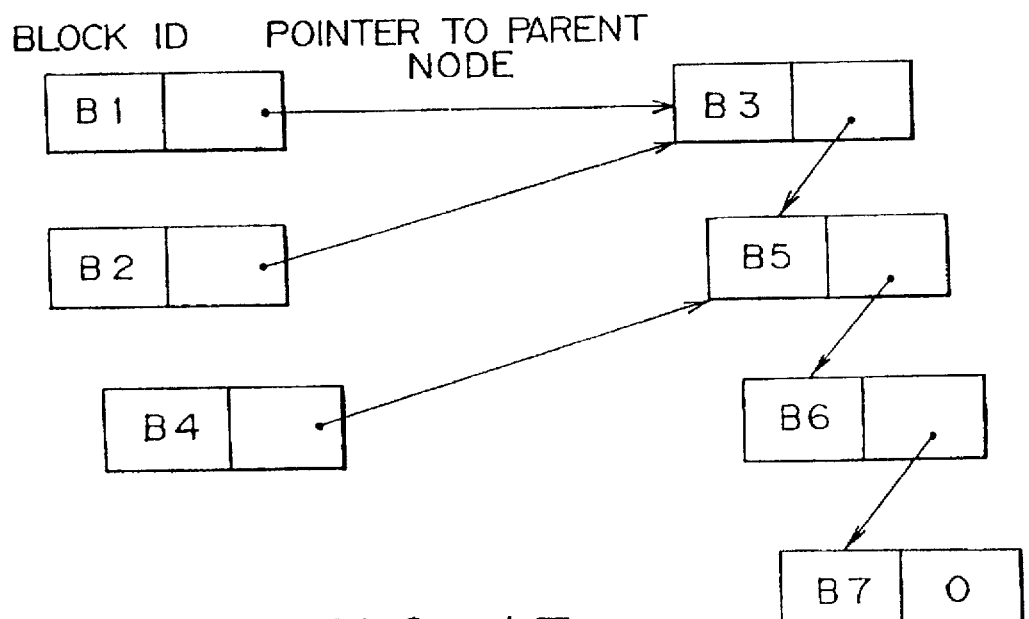
FIG. 16 shows an example of the configuration of the section information according to the embodiment of the present invention.
FIG. 17 shows an example of the configuration of the block tree structure information according to the embodiment of the present invention.

FIG. 16 shows in detail the generated section information 22. The information consists of elements each corresponding to a section. Each element comprises a section start line number and a pointer to a block node. A section start line number is also used as a section identifier. A pointer designates a block node corresponding to a block directly containing the section. For example, a pointer (B5) indicates the address in the main storage unit 11 at which the block node associated with block B5 is located. Pointer value 0 is used to show the end of section information here. Otherwise, a relative address of a block node from the starting address of the area of block tree structure information 23. We suppose that the top of block tree structure information 23 is not used for any node.

Since each element is arranged in the ascending order of section start line numbers, the comparison of a section start line number with a specified line number obtains an element of a section containing the specified line. The section information 22 can be generated according to other methods such as a binary tree search, etc. so that it can be accessed at a higher speed.

FIG. 17 shows in detail the generated block tree structure information 23. Each element refers to a block node, and the contents comprise a block identifier (block ID) and a pointer to a parent node. B1, B2, etc., in the elements refers to a block ID. The root of the tree can be identified by pointer 0 to its parent. A block identifier can be a line number of the start position of the block in a source file, or a line number of the end position of the block. It also can be a pair of a start line number and an end line number. Furthermore, a pointer value can be a relative address in the block tree structure information 23. If a relative address is used, the block tree structure information 23 is preliminarily generated on the basis of a load module of program B, stored in the external storage unit 12, etc. and preferably used as being read to the main storage unit 11 in a practical process because a relative address does not depend on a read address in the main storage unit 11. This is also applicable to the section information 22.

Figure 18:
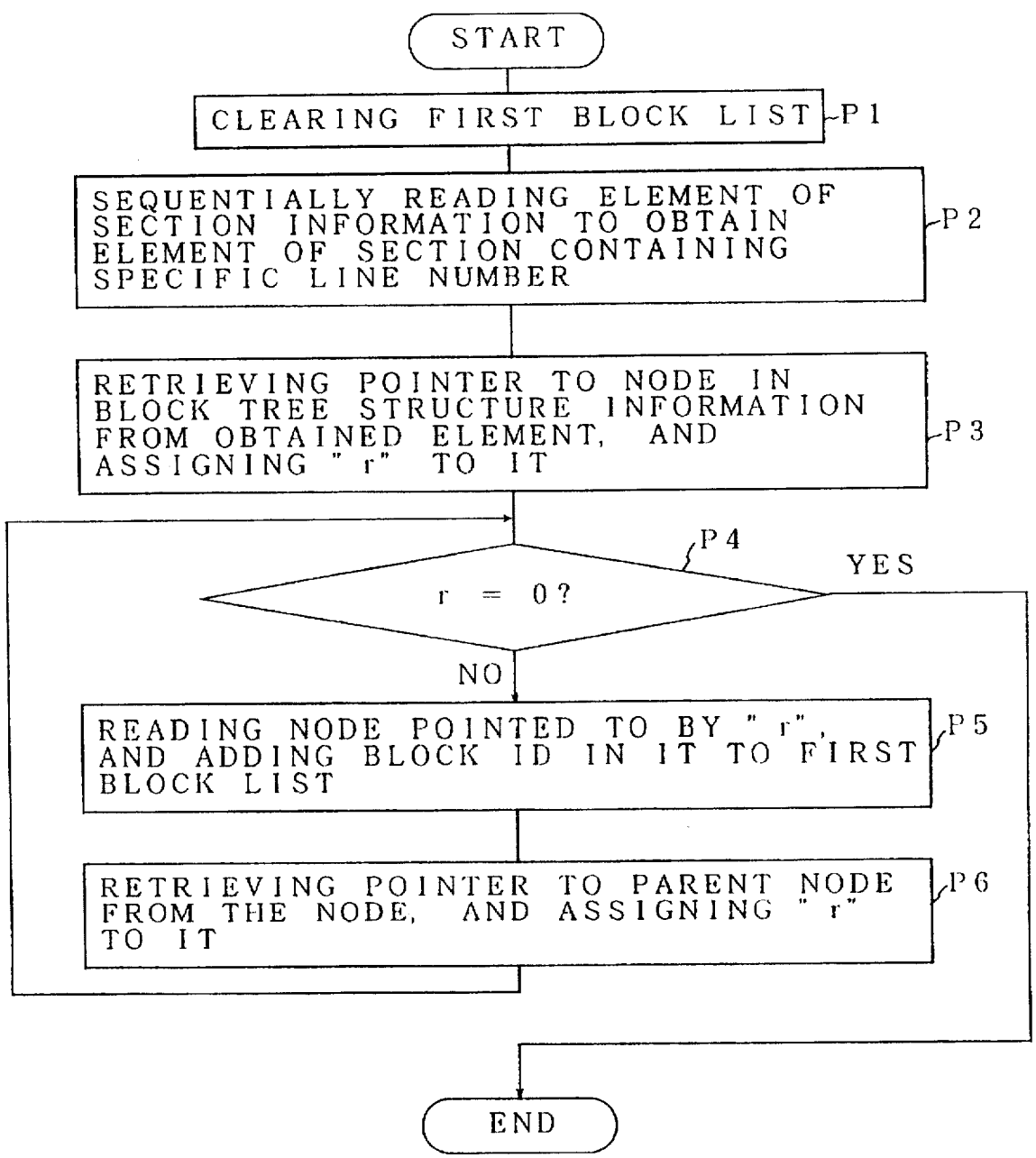
FIG. 18 is the flowchart indicating the process of generating the first block list according to the embodiment of the present invention.

FIG. 18 shows the flow of the process of generating the first block list according to the embodiment of the present invention. The first block list is generated by program A by accessing on the basis of specific line number n the section information shown in FIG. 16 and then the block tree structure information 23 shown in FIG. 17. The purpose of the first block list is to show from inside to outside blocks including the specific line number in a source program.

First, in process P1, the first block list generation area 26 is cleared.

Then, in process P2, the section information is read sequentially from the head. An element corresponding to the section containing the specific line number n is obtained. For example, when the section information is represented in the format shown in FIG. 16, a section element is obtained in process P2 only if the section start line number in the section element is equal to or smaller than n, and the section start line number of the next section element is larger than n or no next elements exist.

Then, in process P3, a pointer to a block node in the block tree structure information 23 is retrieved according to the obtained element, and is labeled "r". Pointer r points to a block node for the innermost block containing the section in the source program of program B.

In process P4, the pointer is checked if it indicates a node or 0. If "0", the process terminates. Since r is not 0 initially, control is passed to process P5 in general.

In P5, a block node pointed to by pointer r is read and the block ID contained is added to the first block list.

Then, in process P6, a pointer to a parent node is got from the block node, and is labeled r again. Control is passed to process P4. The pointer points to the node for the immediately outer block of the present block.

In process P4, the process terminates if pointer r indicates 0. This implies that the former node is the root of the tree, and that the outermost block containing the specific line has been obtained.

If r does not indicate 0 in process P4, the pointer points to its parent node, and control is passed to processes P5, P6 and so on.

Figure 19A:
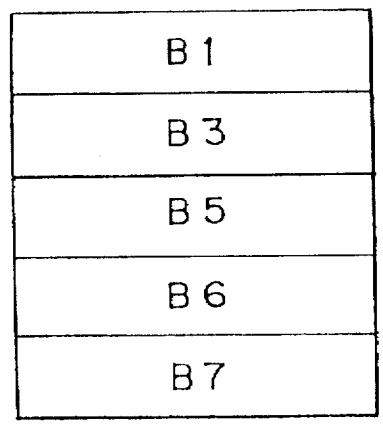
FIGS. 19A–C shows an example of the first block list according to the embodiment of the present invention.
Figure 19B:
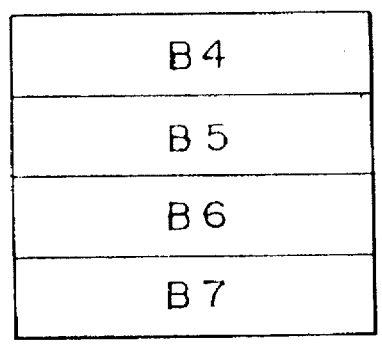
Figure 19C:
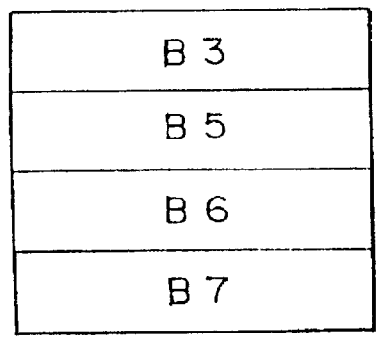

FIGS. 19A, 19B, and 19C show an example of the first block list generated by accessing the section information and the block tree structure information based on a specified line position according to the procedure shown in FIG. 18. FIG. 19A shows the process performed when a specific line position is located between L3 and L4, and the blocks containing the line are B1, B3, B5, B6, and B7 from inside to outside sequentially. In FIG. 19A, block ID's are arranged in the order of getting from each node while tracing the path from the block node in the block tree structure information pointed to by an element containing L3 to the root of the tree.

Figure 20:
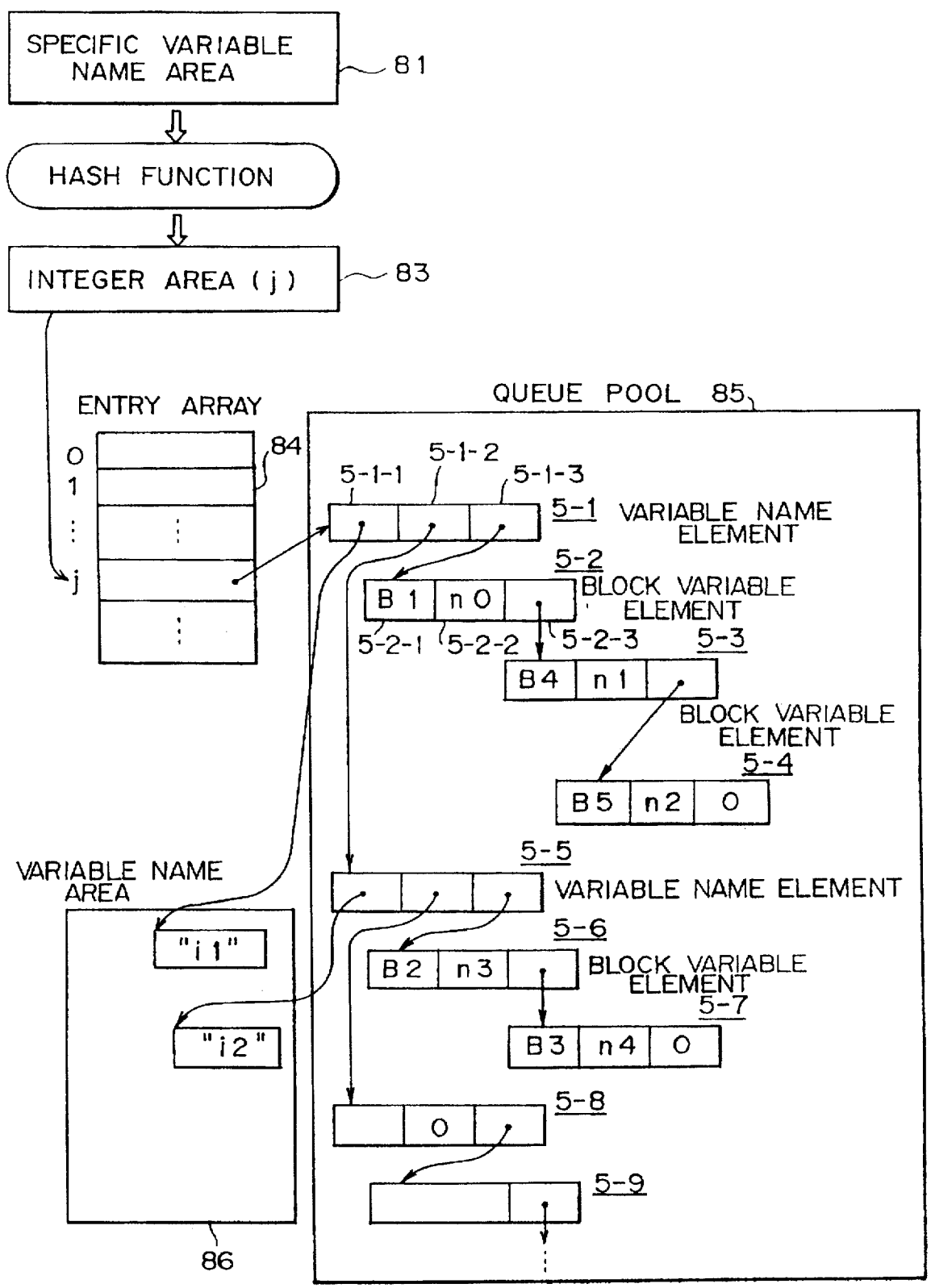
FIG. 20 shows an example of the configuration of the variable-name-to-block correspondence information according to the embodiment of the present invention.

FIG. 20 shows an example of the configuration of the generated variable-name-to-block correspondence information 24. The information comprises an entry array 84, a queue pool 85, and a variable name area 86. Additional data areas to be used when the variable-name-to-block correspondence information is accessed are a specific variable name area 81 and an integer area 83 for storing a hash value j.

An accessing process is set by entering a specific variable name in the variable name area 81. After the variable name is transformed into integer value j using a hash function, the value j is stored in the integer area 83. If the same variable name is transformed using a hash function, obtained value j is always same. However, if a different variable name is transformed, value j can be changed. In some cases, different variable names can also be transformed to the same value of j.

The j-th element in the entry array 84 points to the leading element in a chain of variable name elements in the queue pool 85.

All element in the queue pool 85 is an open element, a variable name element, or a block variable element. A variable name element is entered for each variable name defined in the source program of program B. A block variable element is entered for each variable defined in any block in the source program. An open element stores no data and be entered data when the variable-name-to-block correspondence information is generated, all elements are initially space elements.

Among variable name elements, those having the variable name assigned the same hash value j form a variable name element chain in the queue pool 85. Likewise, among block variable elements, those having the variable assigned the same variable name form a block variable element chain in the queue pool 85. Then, each block variable element chain is generated by branching from each element in the variable name element chain.

Variable name element 5-1 stores pointer 5-1-1 to a corresponding variable name in the variable name area 86, pointer 5-1-2 to the next variable name element 5-2 in a variable name element chain, and pointer 5-1-3 to a block variable element chain comprising the block variable elements associated with the variable having the variable name.

Block variable element 5-2 stores pointer 5-2-3 to the next block variable element in the block variable element chain, block ID 5-2-1 of a block defining the variable, and symbol element number 5-2-2 in the symbol table as the variable information on the variable. Other variable name elements 5-5 and 5-8, and block variable elements 5-3, 5-4, 5-6, 5-7, and 5-9 can be similarly defined. However, block variable elements 5-4 and 5-7 store a pointer value 0 as the pointer to the next block variable element indicating that it is the end of a chain.

To collect all block variable elements associated with variables having a specific variable name, the specific variable name is transformed into integer value j using a hash function; the j-th element in the entry array 84 is retrieved; a variable name element chain pointed to by the element is traced; a variable name element corresponding to a specific variable name is retrieved; and all block variable elements are collected by tracing the block variable element chain pointed to by the variable name element. Thus, a block ID defining the variable and the symbol element number of each variable can be successfully collected for all variables having the specific variable name.

Figure 21:
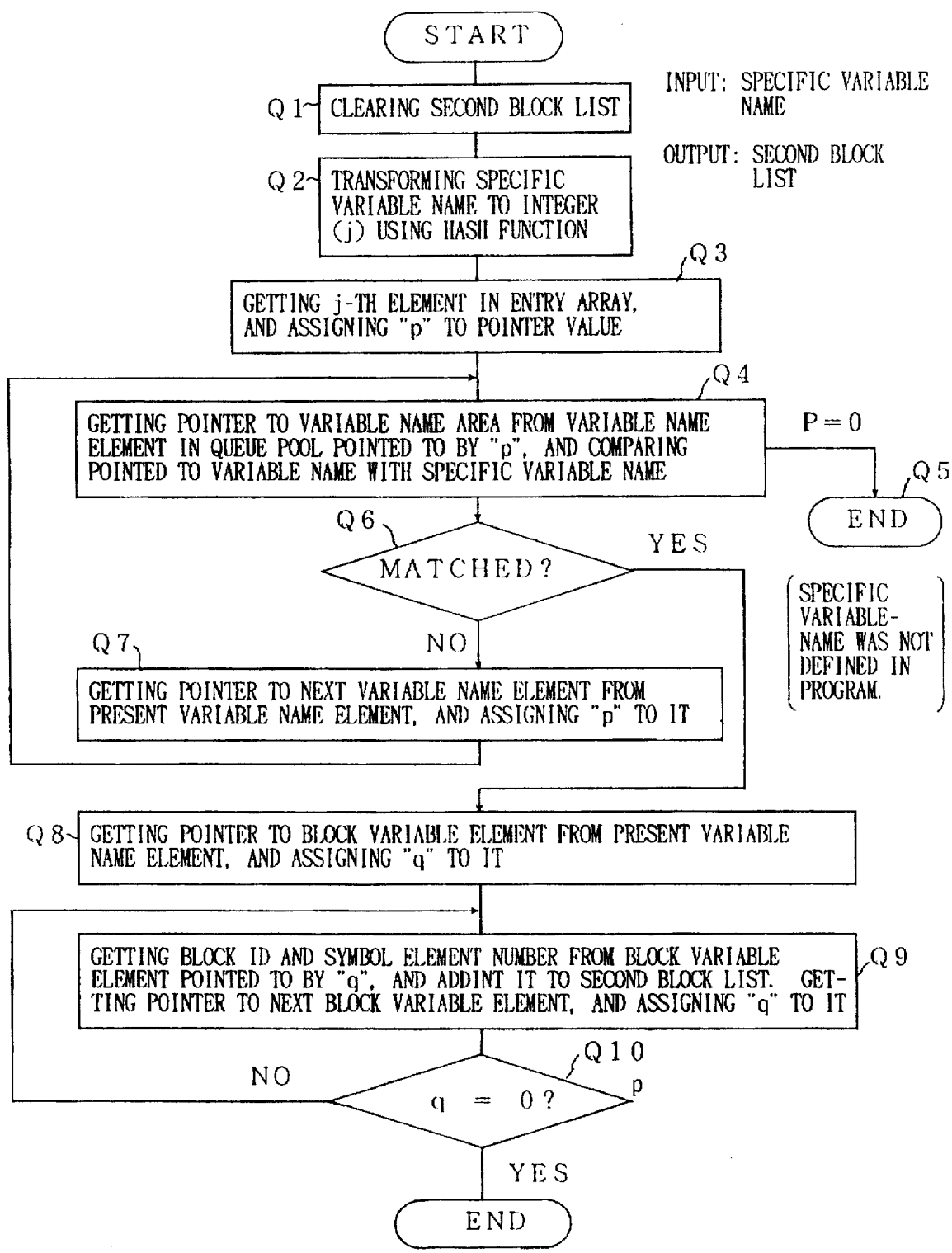
FIG. 21 is the flowchart indicating the process of generating the second block list according to the embodiment of the present invention.

FIG. 21 shows the flow indicating a process of generating the second block list. The process is performed by program A to generate, based on a specific variable name, according to the variable-name-to-block correspondence information shown in FIG. 20, the second block list consisting of elements of pairs of a block ID and a symbol element number of a variable, for all variables defined in program B and having the specific variable name.

First, in process Q1, the second block list generation area 27 is cleared.

Then, in process Q2, a specific variable name is transformed into integer j using a hash function.

In process Q3, the j-th element is retrieved from the entry array, and a pointer value in the element is set in p.

Then, in process Q4, a pointer to the variable name area 86 is retrieved according to a variable name element in the queue pool 85 pointed to by p, and the pointed-to variable name is compared with the specific variable name.

Then, in process Q6, a comparison result is checked. If the result was not a coincidence, then control is passed to process Q7, and a pointer to the next variable name element is got from the present variable name element in process Q7 and labeled "p", and then process Q4 is entered.

If p indicates 0 in process Q4, then it means that the last element of the variable name element chain, for example, variable name element 5-8, is accessed, and the process terminates at Q5. This implies that the specific variable name has not been defined in the program.

If the result of previous comparison was a coincidence, control is passed to process Q8 from process Q6.

In process Q8, a pointer to a block variable element is got from the present variable name element and labeled "q". Then, control is passed to process Q9.

In process Q9, a block ID and a symbol element number are retrieved from the block variable element pointed to by q, and are added to the second block list. Then, a pointer to the next block variable element is got and labeled "q".

Then, in process Q10, it is determined whether or not q indicates 0. If 0, the process terminates. If not 0, control is passed to process Q9.

For example, when a specific variable name i1 is assigned in FIG. 20, integer j can be obtained on basis of "i1" using a hash function. When the j-th element in the entry array 84 is got and then variable name element 5-1 pointed to by the element is got, variable name i1 in the variable name area is pointed to, which matches the specific variable name. As a result, pointer 5-1-3 to the block variable element can be got. The pointed block variable element 5-2 corresponds to variable i1 defined in block B1, and the symbol element number is n0. The next pointed-to block variable element 5-3 corresponds to variable i1 defined in block B4, and the symbol element number is n1. Furthermore, the next block variable element 5-4 corresponds to variable i1 defined in block B5, and the symbol element number is n2.

When variable name i2 is assigned as specific variable, and the variable name is transformed into the same integer j using a hash function, variable name element 5-5 is obtained after variable name element 5-1 is passed on Tracing variable name element chain. Since the variable name element 5-5 corresponds to variable name i2, block variable elements 5-6 and 5-7 are obtained on tracing the block variable element chain. They are block variable elements for variable i2 defined in blocks B2 and B3 respectively.

FIG. 22 shows an example of the second block list thus obtained. It is generated based on specific variable name i1. That is, a variable having variable name i1 is defined in blocks B1, B4, and B5, and the symbol element numbers for the variables are n0, n1, and n2 respectively.

Figure 23:
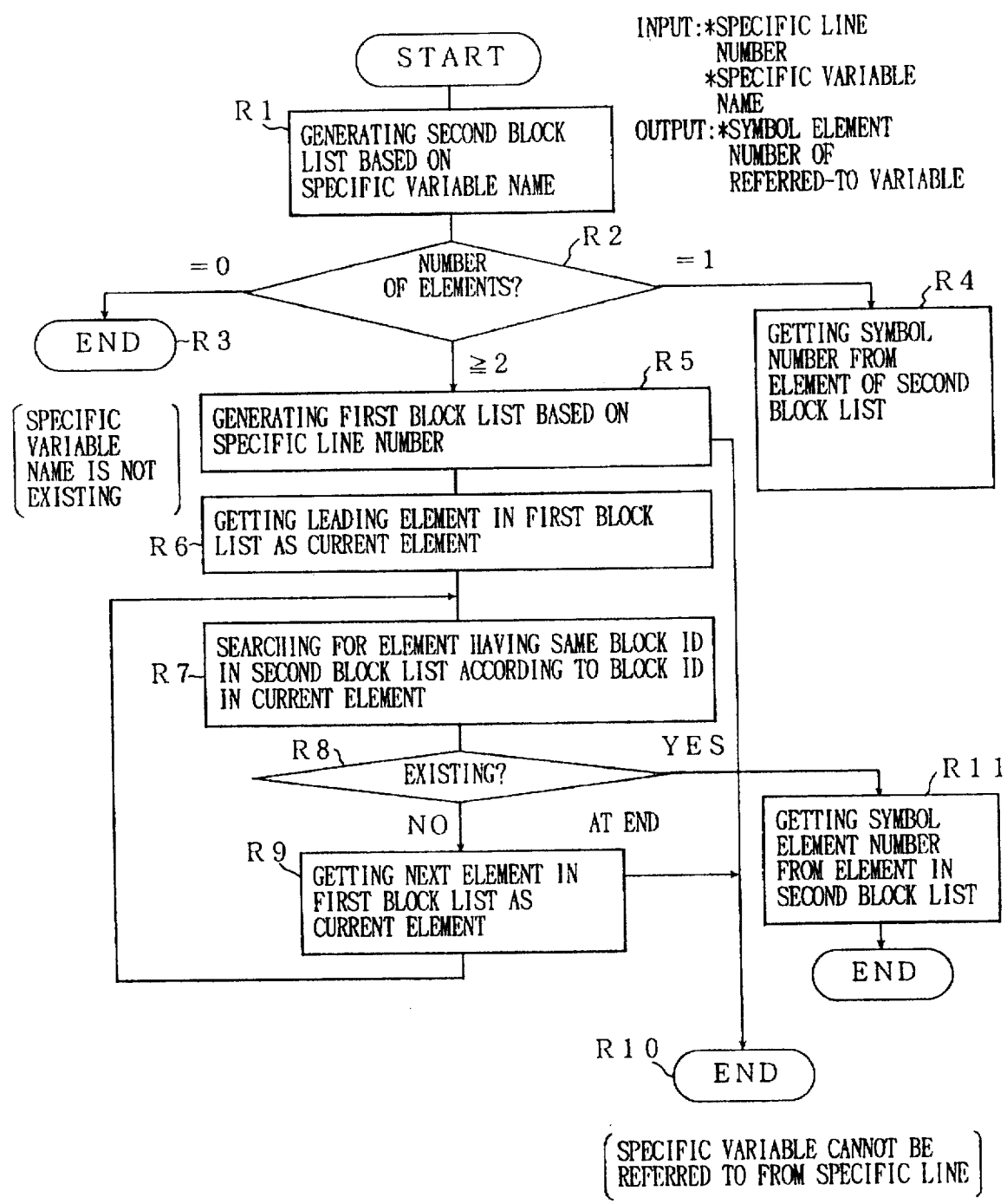
FIG. 23 is the flowchart indicating the process of obtaining the number of the symbol element of the referred-to variable according to the present invention.

FIG. 23 is the flowchart indicating the process, performed by program A, of obtaining a symbol element number of a variable having a specific variable name and referred to from a line having a specific line number.

First, in process R1, a second block list is generated based on the specific variable name.

Next, in process R2, the number of elements in the second block list is checked. If the number is 0, the process terminates in process R3. It indicates that the specific variable name is not defined in the program. If the number of elements is 1 in process R2, then the count of variables having the specific variable name is 1, the symbol element number is retrieved from the element, and the process terminates. If the number of elements is equal to or greater than 2 in process R2, control is passed to process R5.

In process R5, the first block list is generated based on the specific line number. If the specific line number does not match any of the line numbers in section information, process enters R10 and terminates because of an invalid line number.

Then, in process R6, the leading element of the first block list is retrieved as current element, and control is passed to process R7.

In process R7, according to the block ID in the current element of the first block list, an element having the same block ID is searched for in the second block list.

Next, if an element is detected in process R8, then process R11 is entered. If it is not detected, control is passed to process R9.

In process R11, a symbol element number is got from the corresponding element in the second block list, and the process terminates.

In process R9, the next element is got from the first block list. However, if no next element exists, control is passed to process R10 and is terminated because no variable having the specific variable name can be referred to from the specific line.

If an element has been successfully got in process R9, control is passed to process R7.

Figure 24:
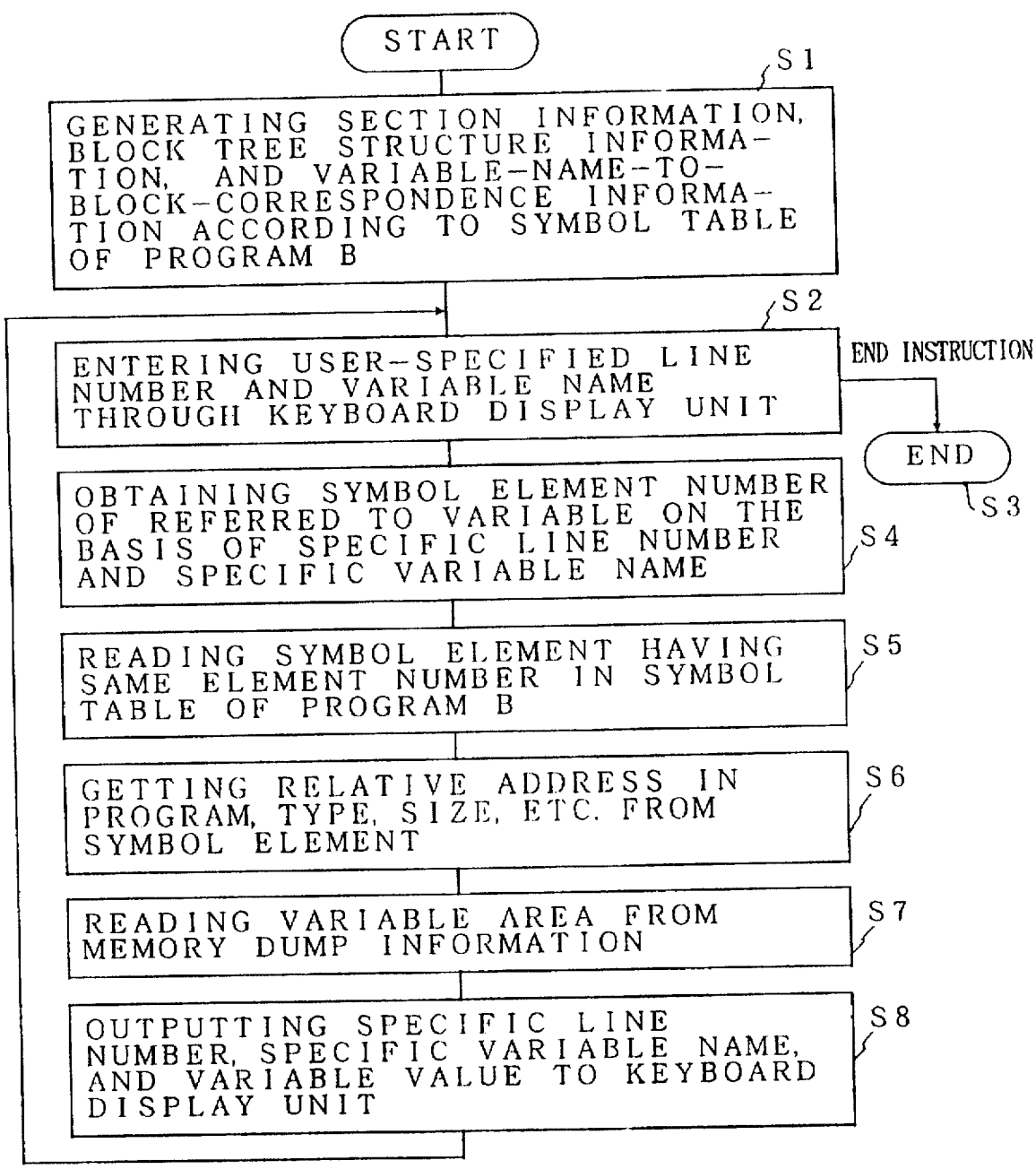
FIG. 24 is the flowchart indicating the entire flow of the process performed by the embodiment of the present invention.

FIG. 24 is the flowchart indicating the process flow of the entire embodiment of the present invention. In this process, a user-specified line number and variable name are entered through the keyboard display unit 13; a referred-to variable having the specific variable name is searched for on the basis of the specific line number and variable name; an address in memory dump information of program B is obtained from the symbol element of the referred-to variable; the value of the area of referred-to variable is read from the memory dump information; and the value is displayed on the keyboard display unit 13.

First, in process S1, program A generates the section information 22, the block tree structure information 23, the variable-name-to-block correspondence information 24 on the basis of the symbol table in the symbol table read area 21.

Next, in process S2, the user enters a specific line number and a specific variable name in the source program through the keyboard display unit 13. If an end instruction is entered here, process S3 is entered and the entire process terminated.

Then, in process S4, a symbol element number of a referred-to variable is obtained based on the specific number and the specific variable name according to the process flow shown in FIG. 23.

Next, in process S5, a symbol element having the same element number in the symbol table of program B is read.

Then, in process S6, the relative address in the program, type, size, etc. are got from the symbol element.

Next, in process S7, a corresponding variable area is read from the memory dump information of program B in the external storage unit 12 to the memory dump information read area 25 of program B.

Then, in process S8, the specific line number, the specific variable name, and the value of a variable stored in the read variable area are outputted to the keyboard display unit 13. Then, process S2 is entered and the next specific line number and variable name are inputted. Thus, the user checks the state of the execution of program B while changing specific line numbers and specific variable names.

Figure 25:
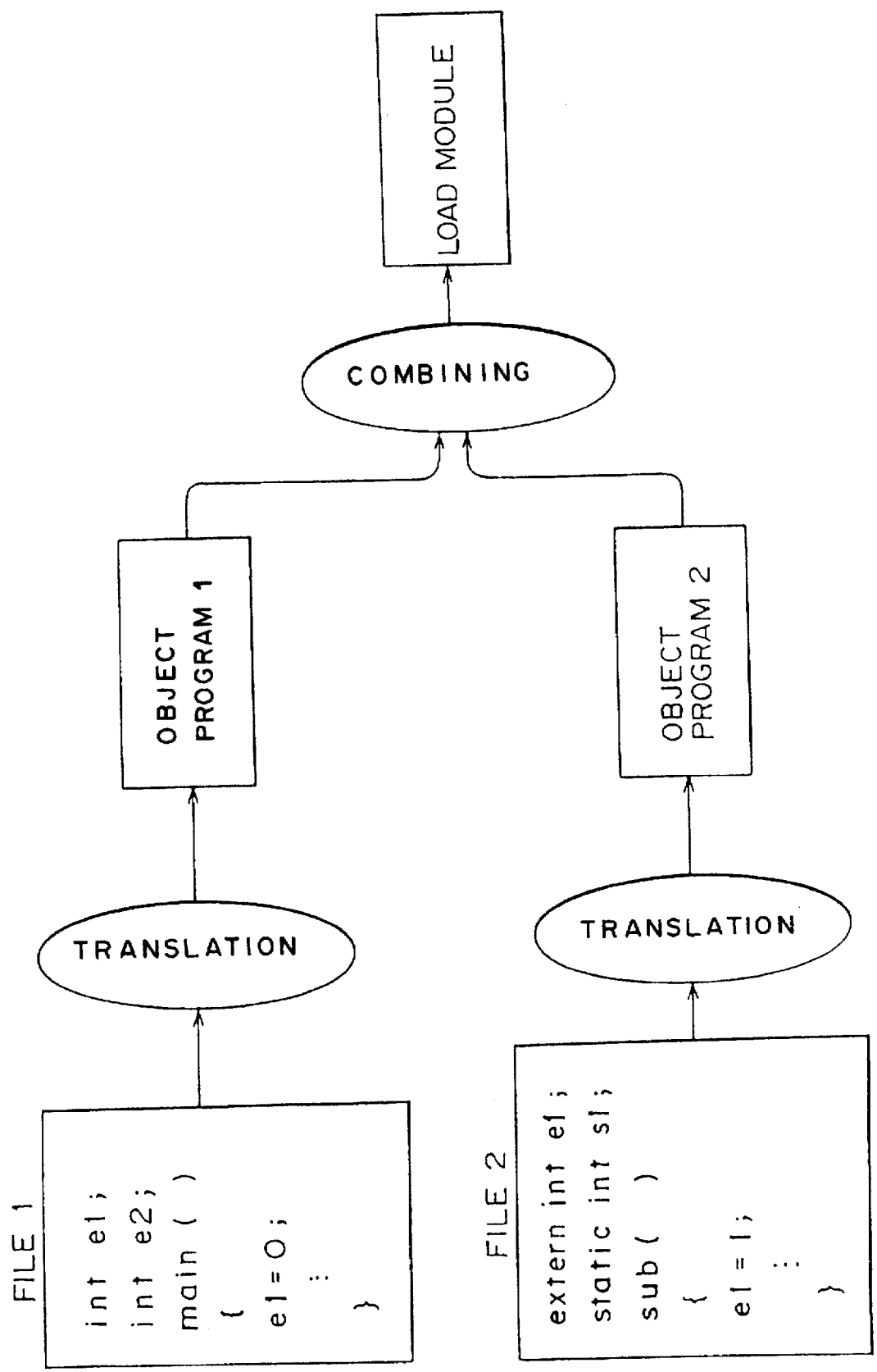
FIG. 25 shows the process of generating the load module according to the embodiment of the present invention.
Figure 26:
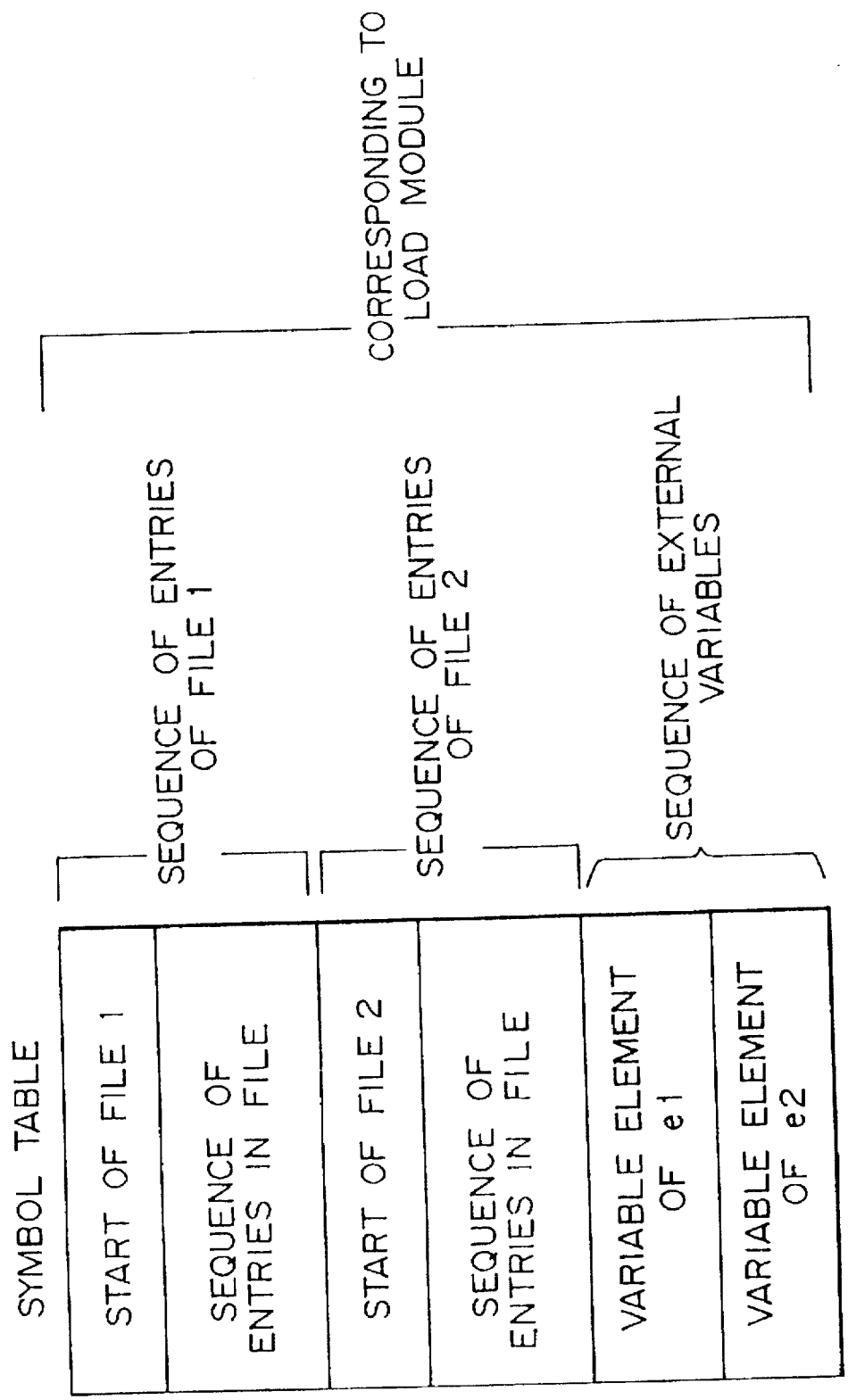
FIG. 26 shows an example of the configuration of the symbol table of the load module generated by a several files according to the embodiment of the present invention.

FIG. 25 shows an example of generating a load module from several source files. FIG. 26 shows an example of the configuration of the symbol table of a load module generated from several source files shown in FIG. 25. FIG. 25 shows the process of generating a load module whose source program comprises two source files, that is, files 1 and 2. First, a translation program translates files 1 and 2 separately, and converts them to object programs 1 and 2 respectively. Then, a linker program combines object programs 1 and 2 to generate one load module.

FIG. 26 shows the symbol table generated by retrieving symbol elements shown in FIG. 4 from the symbol table contained in the load module thus generated The symbol table shown in FIG. 26 contains the sequences of entries corresponding to files 1 and 2, each forming a single block.

The variable elements of variables e1 and e2 form a sequence of external variables. Thus, a load module generated from several source files can be processed in the same manner as a load module generated from a single source file to determine a referred-to variable.

When a referred-to variable determining process is repeatedly performed, data of an already referred-to variable are stored as an element in an accumulation area 28. The data contains a specific variable name, section span information containing a specific line, and a symbol element number of a determined referred-to variable. When a specific variable name and a specific line number are given, the accumulation area 28 is searched for an element to satisfy the conditions that the given specific variable name matches a stored specific variable name, and that the given specific line number is contained by a section indicated by a stored section span information. If such an element is detected, its symbol element number is used. If it is not detected, a symbol element number is obtained according to the process shown in FIG. 23.

If the given specific variable name matches any of the specific variable names stored in the accumulation area 28, then the second block list stored corresponding to the variable name is used.

When a referred-to variable determining process is repeatedly performed, a specific variable name and generated first and second block lists of an already referred-to variable are stored in the accumulation area 28.

In the variable-name-to-block correspondence information shown in FIG. 20, symbol numbers n0, n1, etc. in the symbol table are stored as variable information. Instead, a symbol element of a variable, which can be referred to according to a symbol element number, can be stored in variable-name-to-block information.

In this case, a symbol element is also stored in the second block list. In process R11 shown in FIG. 23, a symbol element itself instead of a symbol element number is retrieved. Therefore, a process of retrieving a corresponding variable element from a symbol table according to a symbol element number is not required at all, thus obtaining a referred-to variable at a higher speed.

Next, when a referred-to variable is determined based on specified line number and variable name, a correspondence of line number and first block list can be contained as well as the first block list in the accumulation area 28.

Thus, if already generated first and second block lists can be re-used, such block lists do not have to be generated for each application. Therefore, a process can be performed at a higher speed.

According to the present embodiment, a specific line number is compared with a section start line number of each section in the section information shown in FIG. 16 to obtain the section where specific line number belongs. In a different programing style, section information may should contain end line number and section may should be determined comparing and line numbers. In another case, for example several blocks share the same line, which is theoretically possible in C language, section information must contain start and end position by line number and character position. The process above is also applied to all these cases.

The embodiment shown in FIG. 1 is an example of applying the present invention when program B is debugged. However, the present invention is not limited to this application, and can also realize a process of interpreting and executing a source program using an interpreter, etc. at a high speed according to a similar referred-to variable determining method.

What is claimed is:

1. A referred-to variable determining method of obtaining a value of a referred-to variable defined in a source program having a specific variable name referred to at a specific position in a source program written in a language having a block structure, comprising the steps of:

generating block tree structure information indicating a nesting relationship between blocks in said source program in the structure of a tree by corresponding a node of said tree to said block, where the node contains a pointer to the node corresponding to the outer block directly containing said block;

generating section information containing:
a section identifier for identifying a section, which is obtained by splitting said source program by a boundary between blocks in said source program; and
a pointer to a node of block tree structure information for specifying an innermost block in said block tree structure information among blocks containing said section;

generating variable-name-to-block correspondence information for storing, corresponding to a variable name defined in said source program, a set of blocks in which a variable having the variable name is defined; and determining said referred-to variable by
searching the nodes in said tree structure information from the node of the block specified by said pointer in the section including said specific position to the root of said tree; and
selecting a variable having said specific variable name which is defined in the first node searched in said searching step and which also is included in blocks stored in said variable-name-to-block correspondence information corresponding to said variable name.

2. The referred-to variable determining method according to claim 1, wherein
said step of determining said referred-to variable includes
obtaining a pointer corresponding to a section containing said specific position according to said section information; and
selecting a variable having said specific variable name defined in an innermost block of said block tree structure information among blocks common between a first set of blocks between the innermost block in said block tree structure information pointed to by said pointer in said section information to the root of said tree and a second set of blocks associated with said specific variable name in said variable-name-to-block correspondence information.

3. The referred-to variable determining method according to claim 2, wherein
line numbers of said source file are used to indicate said specific position in said source program and define a span of each of said plurality of sections in said section information when said source program comprises a single source file.

4. The referred-to variable determining method according to claim 2, wherein
when said source program comprises a plurality of source files, each of said source files is processed by corresponding said source file to separate single blocks.

5. The referred-to variable determining method according to claim 4, wherein
a pair of a source file identifier of each of source files and a line number of each of said source files is used to indicate said specific position in said source program and a span of sections in said section information.

6. The referred-to variable determining method according to claim 4, wherein
said plurality of source files are assigned consecutive line numbers to be used for indicating said specific position in said source program and spans of sections in said section information.

7. The referred-to variable determining method according to claim 2, wherein
said variable-name-to-block correspondence information stores variable information for specifying a storage area of a value of a variable for each variable name defined in a block; and
a value of said referred-to variable is obtained by accessing a storage area specified by said variable information of a variable determined to be said referred-to variable from said variable-name-to-block correspondence information.

8. The referred-to variable determining method according to claim 7, wherein
said section information contains a start position of said section as said section identifier;
said specific position is compared with said start position of each section in said section information, and if said specific position is greater or equal to said start position and is less than a start position of the next section, said specific position is determined as included in said section,
said specific variable name, the obtained section span information of the section, and variable information of an already referred-to variable are stored previous to said referred-to variable determining process,
when a specific variable name and a specific position are given, said stored variable information is used as variable information on a referred-to variable corresponding to said given specific variable name and said given specific position if said given specific variable name matches a stored specific variable name, and if said given specific position is within a stored section span information of the section; and
if said given specific variable and position do not match a stored specific variable name and span information of the section, then variable information on said referred-to variable having a given specific variable name and a given specific position is obtained by
searching in the nodes in said tree structure information from the node of the block specified by said pointer in the section including said specific position to the root said tree, and
selecting a variable having said specific variable name which is defined in the first block corresponding to a node searched in said searching step and also included in the blocks stored in said variable-name-to-block correspondence information corresponding to said variable name.

9. The referred-to variable determining method according to claim 7, further comprising the steps of:
using a symbol element number, corresponding to a symbol element, in a symbol table obtained by translating said source program, for specifying the storage position of the variable as said variable information and,
determining said referred-to variable from said symbol element number.

10. The referred-to variable determining method according to claim 1, further comprising the steps of:
obtaining a pointer to a block containing said specific position by referring to said section information,
generating a first block list by retrieving a set of blocks in a path in said block three structure information from a node specified by the obtained pointer to the root of said tree;
generating a second block list by retrieving a set of blocks associated with said specific variable name in said variable-name-to-block correspondence information; and
determining a variable having said specific variable name defined in a block corresponding to a nearest node to the leaf in said block tree structure information among blocks common between said first block list and said second block list to be said referred-to variable.

11. The referred-to variable determining method according to claim 10, further comprising the steps of:
determining a variable having said specific variable name as defined in said block and as said referred-to variable when a count of blocks in said generated second block list is 1; and
determining a variable having said specific variable name as defined in said block and as said referred-to variable, when the count of blocks in said second block list is equal to or larger than 2, according to said specific position, said section information, and said block tree structure information.

12. The referred-to variable determining method according to claim 10, further comprising the steps of:
storing section span information containing said specific position as previous section span information and said first block list of an already referred-to variable as a previous first block list when said referred-to variable determining method was performed;
when a next specific position is given, comparing said next specific position with said section span information;
using said previous first block list as a first block list for said next specific position, if said given specific position is within said previous section span information; and
if said next specific position does not match said previous section span information.

13. The referred-to variable determining method according to claim 10, further comprising the steps of:
storing said specific variable name as a previous specific variable name and said second block list of an already referred-to variable as a previous second block list when said referred-to variable determining method was performed;
when a next specific variable name is given, comparing said next specific variable name with said previous specific variable name;
using said previous second block list as a second block list for said next specific variable name, if said next specific variable name matches said previous specific variable name; and
generating a second block list by retrieving a set of blocks associated with said next specific variable name in said variable-name-to-block correspondence information, if said next specific variable name does not match said previous specific variable name.

14. The referred-to variable determining method according to claim 10, wherein said variable-name-to-block correspondence information stores variable information for specifying a storage area of a value of a variable defined in a block for each variable name used in said source program;
said second block list retrieves from said variable information of said variable-name-to-block correspondence information, specific variable name storage areas, each respectively corresponding to said specific variable name, for each block of said second block list,
a referred-to variable storage area is determined by retrieving from said second block list one of said specific variable name storage areas corresponding to a variable determined to be said referred-to variable.

15. The referred-to variable determining method according to claim 10, further comprising the steps of:
generating a block identifier for a block corresponding to each node in said block tree structure information;
storing, corresponding to a variable name, a set of block identifiers for identifying blocks in which a variable having the variable name is defined in said variable-name-to-block correspondence information;
generating a first block list by retrieving a set of block identifiers of nodes in a path in said block tree structure information from a node specified by a pointer corresponding to a section containing said specific position to the root of the tree;
generating a second block list by retrieving a set of block identifiers corresponding to said specific variable name in said variable-name-to-block correspondence information; and
determining a variable having said specific variable name defined in a block identified by a block identifier corresponding to a node nearest to the leaf of the tree in said block tree structure information among block identifiers common between said first block list and said second block list to be said referred-to variable.

16. The referred-to variable determining method according to claim 15, further comprising the steps of
generating a pointer to a parent node which directly includes each node in said block tree structure information, and
generating said first block list by retrieving a set of block identifiers corresponding to each node sequentially specified by said pointer to said parent node in a path in said block tree structure information from a node specified by a pointer corresponding to a section containing said specific position to the root of the tree.

17. The referred-to variable determining method according to claim 10, comprising the steps of
generating tree structure information where a node is a pointer to a parent node which directly includes each node in said block tree structure information;
storing, corresponding to a variable name, a set of pointers to a node in said block tree structure information corresponding to a block in which a variable having the variable name is defined in said variable-name-to-block correspondence information;
generating a first block list by retrieving a pointer corresponding to a section containing said specific position and a set of pointers to said parent node contained by each node in a path in said block tree structure information from a node specified by said pointer corresponding to said section containing said specific position to the root of the tree;
generating a second block list by retrieving a set of pointers to nodes in said block tree structure information corresponding to blocks defining said specific variable name in said variable-name-to-block correspondence information; and determining a variable having said specific variable name and defined in a block corresponding to a node nearest to the leaf among nodes in said block tree structure information specified by pointers common between said first and second block lists to be said referred-to variable.

18. A referred-to variable determining device for obtaining a value of a referred-to variable having a specific variable name according to a specific position and said specific variable name in a source program written in a language having a block structure, comprising:

information generating means for generating block tree structure information indicating a nesting relationship of blocks of said source program by corresponding a node of said tree to each of said blocks of said source program; section information containing a section identifier for identifying a section obtained by splitting said source program by boundaries between blocks and a pointer to a node of the innermost block including the section, in said block tree structure information among blocks containing said section; and variable-name-to-block correspondence information for storing, corresponding to a variable name used in said source program, a set of blocks in which a variable having the variable name is defined; and determining means for determining said referred-to variable by searching in said tree structure information from the node of innermost block indicated by said pointer of the section including said specific position to the block corresponding to a root of said tree and selecting a variable having said specific variable name which is included in a block of said set of blocks stored in said variable-name-to-block correspondence information.

19. The referred-to variable determining device according to claim 18, wherein said block tree structure information is represented in a tree structure format and indicates the inclusion relationship in a set of blocks with a block of said source program defined as a node of a tree, an outermost block as a root of said tree, and an innermost block as a leaf of said tree;

said pointer contained in said section information specifies a node of said tree corresponding to a block in said block tree structure information;

said determining means comprises:

first block list generating means for generating a first block list containing a set of blocks corresponding to nodes in a path in said block tree structure information from a node specified by a pointer corresponding to a section containing said specific position to the root of the tree; and second block list generating means for generating a second block list containing a set of blocks associated with said specific variable name in said variable-name-to-block correspondence information; and said determining means determines, among blocks common between said first and second block lists, a variable having said specific variable name and defined in a block corresponding to a node nearest to the leaf in said block tree structure information to be said referred-to variable.

* * * * *